(12) United States Patent
Deng et al.

(10) Patent No.: US 12,086,957 B2
(45) Date of Patent: Sep. 10, 2024

(54) IMAGE BLOOM PROCESSING METHOD AND APPARATUS, AND STORAGE MEDIUM

(71) Applicant: HUAWEI TECHNOLOGIES CO., LTD., Guangdong (CN)

(72) Inventors: Yixin Deng, Nanjing (CN); Dong Wei, Shenzhen (CN); Lei Yang, Shanghai (CN); Zhen Li, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 355 days.

(21) Appl. No.: 17/726,674

(22) Filed: Apr. 22, 2022

(65) Prior Publication Data

US 2022/0245778 A1 Aug. 4, 2022

Related U.S. Application Data

(63) Continuation of application No. PCT/CN2020/113088, filed on Sep. 2, 2020.

(30) Foreign Application Priority Data

Oct. 23, 2019 (CN) .......................... 201911014260.3

(51) Int. Cl.
    *G06T 5/50* (2006.01)
    *G06T 5/20* (2006.01)
    *G06T 5/70* (2024.01)

(52) U.S. Cl.
    CPC .................. *G06T 5/50* (2013.01); *G06T 5/20* (2013.01); *G06T 5/70* (2024.01); *G06T 2207/20221* (2013.01)

(58) Field of Classification Search
    CPC .... G06T 5/50; G06T 5/20; G06T 5/70; G06T 2207/20221; G06T 5/94; G06T 2207/20208; G06T 5/73
    See application file for complete search history.

(56) References Cited

U.S. PATENT DOCUMENTS

| 2014/0168249 A1 | 6/2014 | Rempel et al. |
| 2018/0089799 A1* | 3/2018 | Johnson .................. G06T 3/403 |
| 2019/0082090 A1* | 3/2019 | Chen ...................... H04N 23/60 |

FOREIGN PATENT DOCUMENTS

| CN | 102819852 A   | 12/2012 |
| CN | 102917183 A * | 2/2013  |

(Continued)

OTHER PUBLICATIONS

International Search Report and Written Opinion issued in PCT/CN2020/113088, dated Dec. 9, 2020, 10 pages.

(Continued)

*Primary Examiner* — Samir A Ahmed

(57) ABSTRACT

This application discloses an image bloom processing method and apparatus, and a storage medium, and relates to the field of image processing technologies. An electronic device obtains a first brightness region class in a first image, where the first brightness region class includes one or more brightness regions in the first image; after determining that the first brightness region class in the first image is the same as a target brightness region class in a second image on which bloom processing is performed, the electronic device obtains a first intermediate image obtained after Gaussian blur processing is performed on the target brightness region class in the second image; and the electronic device generates a bloom image of the first image based on the first image and the first intermediate image.

20 Claims, 15 Drawing Sheets

(56) References Cited

FOREIGN PATENT DOCUMENTS

| CN | 103069454 A | * | 4/2013 |
|---|---|---|---|
| CN | 105608209 A | | 5/2016 |
| CN | 106550244 A | | 3/2017 |
| CN | 106997608 A | | 8/2017 |
| CN | 107492139 A | | 12/2017 |

OTHER PUBLICATIONS

Oliver Klehm, Interactive Massive Lighting for Virtual 3D City Models, Hasso-Plattner-Institut Potsdam, Oct. 30, 2010, 85 pages.
Extended European Search Report issued in EP20879379.4, dated Nov. 10, 2022, 8 pages.

* cited by examiner

IMAGE BLOOM PROCESSING METHOD AND APPARATUS, AND STORAGE MEDIUM

CROSS-REFERENCE TO RELATED APPLICATIONS

This application is a continuation of International Application No. PCT/CN2020/113088, filed on Sep. 2, 2020, which claims priority to Chinese Patent Application No. 201911014260.3, filed on Oct. 23, 2019. The disclosures of the aforementioned applications are hereby incorporated by reference in their entireties.

TECHNICAL FIELD

This application relates to the field of image processing technologies, and in particular, to an image bloom processing method and apparatus, and a storage medium.

BACKGROUND

Bloom is a common optical phenomenon, and usually refers to a halo overflow phenomenon that occurs when a physical camera photographs an object with relatively high brightness. If bloom processing is performed on an image, contrast of the image may be visually improved, and expressiveness of the image may be visually enhanced, to achieve a relatively good rendering effect. With development of image processing technologies, image bloom processing is widely applied to three-dimensional games, animation production, and other fields.

Currently, a process in which an electronic device for which an image bloom processing function is enabled performs bloom processing on an image includes the following steps: Brightness filtering processing is first performed on an original image, that is, a pixel, in the original image, whose pixel value is less than a brightness threshold is removed, to obtain a filtered image. Then, pixel reduction sampling processing is separately performed on the filtered image by using reduction ratios of $¼$, $⅛$, $1/16$ and $1/32$, to obtain four low-resolution images whose resolution is respectively $¼$, $⅛$, $1/16$, and $1/32$ times that of the original image. Then, Gaussian blur processing is performed on each of the four low-resolution images. Finally, image fusion processing is performed on the original image and the four low-resolution images on which Gaussian blur processing is performed, to obtain a bloom image of the original image. The original image includes two parts: a small-size brightness region and a large-size brightness region. Gaussian blur processing is performed on the low-resolution images whose resolution is respectively $¼$ and $⅛$ times that of the original image, in an attempt mainly to implement bloom processing on the small-size brightness region in the original image, so that a bloom effect is achieved for the small-size brightness region in the original image. Gaussian blur processing is performed on the low-resolution images whose resolution is respectively $1/16$ and $1/32$ times that of the original image, in an attempt mainly to implement bloom processing on the large-size brightness region in the original image, so that a bloom effect is achieved for the large-size brightness region in the image.

However, the electronic device for which the image bloom processing function is enabled performs the bloom processing process on each frame of original image. One bloom processing process includes performing Gaussian blur processing multiple times on brightness regions of different sizes in the original image, and Gaussian blur processing features relatively high computational complexity. Therefore, currently, the electronic device for which the image bloom processing function is enabled has relatively heavy load and relatively high power consumption in a running process.

SUMMARY

This application provides an image bloom processing method and apparatus, a storage medium, and the like, to reduce load and power consumption of an electronic device, for which an image bloom processing function is enabled, in a running process.

The following describes this application from different aspects. It should be understood that mutual reference may be made to implementations and beneficial effects of the following different aspects.

"First" and "second" appearing in this application are merely intended to distinguish between two objects, and do not indicate a sequence.

According to a first aspect, an image bloom processing method is provided. The method includes: An electronic device obtains a first brightness region class in a first image, where the first brightness region class includes one or more brightness regions in the first image; after determining that the first brightness region class in the first image is the same as a target brightness region class in a second image on which bloom processing is performed, the electronic device obtains a first intermediate image obtained by performing Gaussian blur processing on the target brightness region class in the second image; and the electronic device generates a bloom image of the first image based on the first image and the first intermediate image.

Optionally, an object on which bloom processing is performed may be an image obtained through rendering based on a three-dimensional scene, or may be an image directly generated after a physical camera photographs a scene. In this application, description is provided by using an example in which each of the first image and the second image is an image obtained through rendering based on a three-dimensional scene. The first image is obtained through rendering based on a first three-dimensional scene, and the second image is obtained through rendering based on a second three-dimensional scene. Optionally, the first image and the second image may be two consecutive frames of images, in other words, the second image is a previous frame of image of the first image. In this way, the electronic device may complete a determining operation of the first brightness region class in the first image and the target brightness region class in the second image by storing only the previous frame of image of the currently displayed image. In addition, storage performance of the electronic device may be ensured because the electronic device needs to store a relatively small quantity of images.

In this application, when determining that the first brightness region class in the first image is the same as the target brightness region class in the second image on which bloom processing is performed, the electronic device may directly obtain the intermediate image obtained after Gaussian blur processing is performed on the target brightness region class in the second image, and does not need to perform Gaussian blur processing on the first brightness region class in the first image. Therefore, in this application, while a bloom effect of the first image is ensured, a quantity of times Gaussian blur processing is performed on the first image may be reduced, and therefore complexity of an image bloom processing process is reduced, thereby reducing load of the electronic device in a running process after a bloom processing function is enabled, and reducing power consumption of the electronic device.

Optionally, when the first image is obtained through rendering based on the first three-dimensional scene, and the second image is obtained through rendering based on the second three-dimensional scene, that the first brightness region class in the first image is the same as a target brightness region class in a second image includes: Status information of an object model corresponding to the brightness region in the first brightness region class in the first three-dimensional scene is the same as status information of an object model corresponding to a brightness region in the target brightness region class in the second three-dimensional scene, and a camera parameter in the first three-dimensional scene is the same as a camera parameter in the second three-dimensional scene.

In some implementations, a process of determining, by the electronic device, whether the first brightness region class in the first image is the same as the target brightness region class in the second image may include:

The electronic device obtains status information of all object models corresponding to the first brightness region class in the first three-dimensional scene and status information of all object models corresponding to the target brightness region class in the second three-dimensional scene; after determining that the status information of all the object models corresponding to the first brightness region class in the first three-dimensional scene is the same as the status information of all the object models corresponding to the target brightness region class in the second three-dimensional scene, the electronic device obtains the camera parameter in the first three-dimensional scene and the camera parameter in the second three-dimensional scene; and after determining that the camera parameter in the first three-dimensional scene is the same as the camera parameter in the second three-dimensional scene, the electronic device determines that the first brightness region class is the same as the target brightness region class.

Optionally, the status information of the object model may include position and posture information and surface material information. The position and posture information may include a position of the object model, a posture of the object model, and a scaling coefficient of the object model. The surface material information may include color information of a surface material of the object model and map information of the surface material. The camera parameter includes a position and posture parameter, a view window parameter, and a field of view parameter of a camera.

That the status information of all the object models corresponding to the first brightness region class in the first 3D scene is the same as the status information of all the object models corresponding to the target brightness region class in the second 3D scene means that the first brightness region in the first brightness region class is in a one-to-one correspondence with the second brightness region in the target brightness region class, and status information of an object model corresponding to each first brightness region is the same as status information of an object model corresponding to a corresponding second brightness region.

In this application, when the first brightness region class in the first image is the same as the target brightness region class in the second image on which bloom processing is performed, the electronic device may directly obtain the first intermediate image obtained after Gaussian blur processing is performed on the target brightness region, and use the first intermediate image as an image obtained after Gaussian blur processing is performed on the first brightness region class in the first image. In this case, in the running process, the electronic device for which the image bloom processing function is enabled does not need to perform Gaussian blur processing on the first brightness region class in the first image. Therefore, running load of the electronic device is reduced, and power consumption of the electronic device is reduced.

Optionally, the first image further includes a second brightness region, and a second brightness region class includes a brightness region other than a background class brightness region in the first image.

In some implementations, after determining that the second brightness region class in the first image is different from any brightness region class in the second image, the electronic device may further perform Gaussian blur processing on the second brightness region class, to obtain a second intermediate image. In this case, a process of generating, by the electronic device, the bloom image of the first image based on the first image and the first intermediate image includes: The electronic device performs image fusion processing on the first image, the first intermediate image, and the second intermediate image, to obtain the bloom image of the first image.

The electronic device may first determine whether the second image on which bloom processing is performed includes a brightness region class that is the same as the second brightness region class in the first image, and after determining that the second brightness region class in the first image is different from any brightness region class in the second image, perform Gaussian blur processing on the second brightness region class, to obtain the second intermediate image. For a process in which the electronic device may first determine whether the second image on which bloom processing is performed includes a brightness region class that is the same as the second brightness region class in the first image, refer to the process of determining, by the electronic device, whether the first brightness region class in the first image is the same as the target brightness region class in the second image on which bloom processing is performed.

Optionally, when a size of each brightness region in the first brightness region class is greater than a size of each brightness region in the second brightness region class, a process of performing, by the electronic device, Gaussian blur processing on the second brightness region class in the first image includes: performing pixel reduction sampling processing on the first image by using a first reduction ratio, to obtain a first reduced image; and performing Gaussian blur processing on the first reduced image, to obtain the second intermediate image. Alternatively, when a size of each brightness region in the first brightness region class is less than a size of each brightness region in the second brightness region class, a process of performing, by the electronic device, Gaussian blur processing on the second brightness region class in the first image includes: performing pixel reduction sampling processing on the first image by using a second reduction ratio, to obtain a second reduced image; and performing Gaussian blur processing on the second reduced image, to obtain the second intermediate image. The first reduction ratio is greater than the second reduction ratio.

Optionally, the first reduction ratio k1 meets the following condition: $k1=2^m$, m is an integer, and $-3 \le n \le 0$. In this application, the first reduction ratio may be a single reduction ratio or a set of a plurality of reduction ratios. For example, a value of n may be −2 or −3. In this case, the first reduction ratio k1 includes ¼ and ⅛. The second reduction ratio k2 may meet the following condition: $k2=2^m$, m is an integer, and m←−3. In this application, the second reduction ratio may be a single reduction ratio or a set of a plurality of reduction ratios. For example, a value of m may be −4 or −5. In this case, the second reduction ratio k2 includes 1/16 and 1/32.

It may be learned that when the first image includes a plurality of brightness region classes, when determining that the second image on which bloom processing is performed includes a brightness region class that is the same as the second brightness region class in the first image, the electronic device may further directly obtain an intermediate image obtained after Gaussian blur processing is performed on the brightness region class that is in the second image and that is the same as the second brightness region class, and does not need to perform Gaussian blur processing on the second brightness region class in the first image. Therefore, in this application, while the bloom effect of the first image is ensured, the quantity of times Gaussian blur processing is performed on the first image may be further reduced, and therefore the complexity of the image bloom processing process is reduced, thereby reducing the load of the electronic device in the running process after the bloom processing function is enabled, and reducing the power consumption of the electronic device.

In some implementations, the electronic device may further perform Gaussian blur processing on the second brightness region class, to obtain a second intermediate image. In this case, a process of generating, by the electronic device, the bloom image of the first image based on the first image and the first intermediate image includes: The electronic device performs image fusion processing on the first image, the first intermediate image, and the second intermediate image, to obtain the bloom image of the first image.

Optionally, a process of obtaining, by the electronic device, the first brightness region class in the first image may include: traversing labels of all object models in the first three-dimensional scene, where the label is used to indicate whether the object model is a background class object model; and obtaining all background class object models in the first three-dimensional scene, where the first brightness region class includes background class brightness regions corresponding to all the background class object models in the first image.

Optionally, before generating the bloom image of the first image based on the first image and the first intermediate image, the electronic device may further perform brightness filtering processing on the first image.

That the electronic device performs brightness filtering processing on the first image is to remove a pixel, in the first image, whose pixel value is less than a brightness threshold, to retain a pixel, in the first image, whose pixel value is greater than or equal to the brightness threshold.

According to a second aspect, an image bloom processing apparatus is provided. The apparatus includes a plurality of function modules. The plurality of function modules interact with each other to implement the method in the first aspect and the implementations of the first aspect. The plurality of function modules may be implemented based on software, hardware, or a combination of software and hardware, and the plurality of function modules may be randomly combined or divided based on a specific implementation.

According to a third aspect, an image bloom processing apparatus, for example, a terminal, is provided. The image bloom processing apparatus includes a processor and a memory. The processor usually includes a CPU and a GPU. The memory is configured to store a computer program. The CPU is configured to execute the computer program stored in the memory, to implement any image bloom processing method in the first aspect. The two types of processors may be two chips, or may be integrated onto a same chip.

According to a fourth aspect, a storage medium is provided. The storage medium may be nonvolatile storage medium. The storage medium stores a computer program, and when the computer program is executed by a processing component, the processing component is enabled to implement any image bloom processing method in the first aspect.

According to a fifth aspect, a computer program or a computer program product is provided, where the computer program or the computer program product includes computer-readable instructions. When the computer program or the computer program product is run on a computer, the computer is enabled to perform any image bloom processing method in the first aspect. The computer program product may include one or more program units, configured to implement any image bloom processing method in the first aspect.

According to a sixth aspect, a chip, for example, a CPU, is provided. The chip includes a logic circuit, and the logic circuit may be a programmable logic circuit. When the chip runs, any image bloom processing method in the first aspect is implemented.

According to a seventh aspect, a chip, for example, a CPU, is provided. The chip includes one or more physical cores and a storage medium. After the one or more physical cores read computer instructions in the storage medium, any image bloom processing method in the first aspect is implemented.

In conclusion, in the image bloom processing method provided in this application, when determining that the first brightness region class in the first image is the same as the target brightness region class in the second image on which bloom processing is performed, the electronic device may directly obtain the intermediate image obtained after Gaussian blur processing is performed on the target brightness region class in the second image, and does not need to perform Gaussian blur processing on the first brightness region class in the first image. Therefore, in this application, while the bloom effect of the first image is ensured, the quantity of times Gaussian blur processing is performed on the first image may be reduced, and therefore the complexity of the image bloom processing process is reduced, thereby reducing the load of the electronic device in the running process after the bloom processing function is enabled, and reducing the power consumption of the electronic device.

In addition, this application further achieves effects mentioned in the foregoing aspects and other technical effects that can be derived.

DESCRIPTION OF EMBODIMENTS

To make the objectives, technical solutions, and advantages of this application clearer, the following further describes embodiments of this application in detail with reference to the accompanying drawings.

With development of computer graphics hardware, there is an increasingly high requirement for an image presentation effect in the fields of games and film and television and other fields. A presentation effect of an image in a game (for example, a three-dimensional (3D) game) and a film and television (for example, an animation) produced by using a 3A level specification increasingly approximates to a photographing effect of a physical camera. Currently, image post-processing may be performed on an image, so that a presentation effect of the image approximates to a photographing effect of the physical camera.

For ease of understanding, the following describes terms used in embodiments of this application.

Image post-processing refers to a process of optimizing an image, and is mainly used to enhance features such as image anti-aliasing, a high dynamic range (HDR), and bloom. Image post-processing technologies include image processing technologies such as bloom processing, anti-aliasing processing, motion blur processing, and depth of field processing. The image post-processing technology may be considered, to some extent, as a filter processing technology similar to PS (photoshop). An object on which image post-processing is performed may be an image obtained through rendering based on a three-dimensional scene.

Figure 1:
FIG. 1 is a schematic diagram of bloom in a photographing scene according to an embodiment of this application.

Bloom is a common optical phenomenon. A physical camera (namely, a real camera or camera) usually cannot focus perfectly when photographing a picture, and therefore in a process in which light passes through a lens of the physical camera for imaging, diffraction is generated on an edge of an object, and a halo overflow phenomenon occurs. It is not likely to perceive bloom in a scene with relatively low brightness (weak light), but bloom is relatively noticeable in a scene with relatively high brightness (strong light). Therefore, bloom usually refers to a halo overflow phenomenon that occurs when the physical camera photographs an object with relatively high brightness. For example, FIG. 1 is a schematic diagram of bloom in a photographing scene according to an embodiment of this application. As shown in FIG. 1, there is a bright window in the photographing scene. In an indoor scene, an indoor object photographed by the physical camera has a clear outline because the object has relatively low brightness. In an outdoor scene, the sun outside the window has relatively high brightness, and therefore light emitted by the sun is beyond an outline of the sun. In this case, a blur effect is generated around the outline of the sun, in other words, a bloom phenomenon occurs.

A bloom effect is also referred to as light bloom in computer graphics, and is a computer graphics effect used in a video game, a demonstration animation, and an HDR. In the bloom effect, fringes or feathers of light are generated around an object with high brightness, to blur image details, in other words, a bloom phenomenon in an imaging process of a physical camera is simulated, so that an image obtained through rendering by an electronic device appears more realistic.

If bloom processing is performed on an image, a bloom effect may be achieved for the image, and therefore contrast of the image is visually improved, and expressiveness of the image and authenticity of the image are visually enhanced, to achieve a relatively good rendering effect. Optionally, an object on which bloom processing is performed may be an image obtained through rendering based on a 3D scene, or may be an image directly generated after the physical camera photographs a scene. In embodiments of this application, description is provided by using an example in which the object on which bloom processing is performed is an image obtained through rendering based on a 3D scene.

Currently, a process in which an electronic device for which an image bloom processing function is enabled performs bloom processing on an image includes the following steps: Brightness filtering processing is first performed on an original image, that is, a pixel, in the original image, whose pixel value is less than a brightness threshold is removed, to obtain a filtered image. Then, pixel reduction sampling processing is separately performed on the filtered image by using reduction ratios of ¼, ⅛, 1/16 and 1/32, to obtain four low-resolution images whose resolution is respectively ¼, ⅛, 1/16, and 1/32 times that of the original image. Then, Gaussian blur processing is performed on each of the four low-resolution images. Finally, image fusion processing is performed on the original image and the four low-resolution images on which Gaussian blur processing is performed, to obtain a bloom image of the original image. However, the electronic device for which the image bloom processing function is enabled performs the bloom processing process on each frame of original image. One bloom processing process includes a plurality of times Gaussian blur processing is performed on brightness regions of different sizes in the original image, and Gaussian blur processing features relatively high computational complexity. Therefore, currently, the electronic device for which the image bloom processing function is enabled has relatively heavy load and relatively high power consumption in a running process.

Embodiments of this application provide an image bloom processing method. When performing bloom processing on a first image, an electronic device for which an image bloom processing function is enabled may obtain a first brightness region class in the first image; when the first brightness region class in the first image is the same as a target brightness region class in a second image on which bloom processing is performed, obtain a first intermediate image obtained after Gaussian blur processing is performed on the target brightness region class in the second image; and generate a bloom image of the first image based on the first image and the first intermediate image. In embodiments of this application, when determining that the first brightness region class in the first image is the same as the target brightness region class in the second image on which bloom processing is performed, the electronic device may directly obtain the intermediate image obtained after Gaussian blur processing is performed on the target brightness region class in the second image, and does not need to perform Gaussian blur processing on the first brightness region class in the first image. Therefore, in embodiments of this application, while a bloom effect of the first image is ensured, a quantity of times Gaussian blur processing is performed on the first image may be reduced, and therefore complexity of an image bloom processing process is reduced, thereby reducing load of the electronic device in a running process after the bloom processing function is enabled, and reducing power consumption of the electronic device.

In embodiments of this application, description is provided by using an example in which each of the first image and the second image is an image obtained through rendering based on a 3D scene. The first image is obtained through rendering based on a first 3D scene, and the second image is obtained through rendering based on a second 3D scene. The second image is an image displayed before the electronic device displays the first image. Optionally, the first image and the second image may be two consecutive frames of images, in other words, the second image is a previous frame of image of the first image. In this way, the electronic device may complete a determining operation of the first brightness region class in the first image and the target brightness region class in the second image by storing only the previous frame of image of the currently displayed image. In addition, storage performance of the electronic device may be ensured because the electronic device needs to store a relatively small quantity of images.

Figure 2:
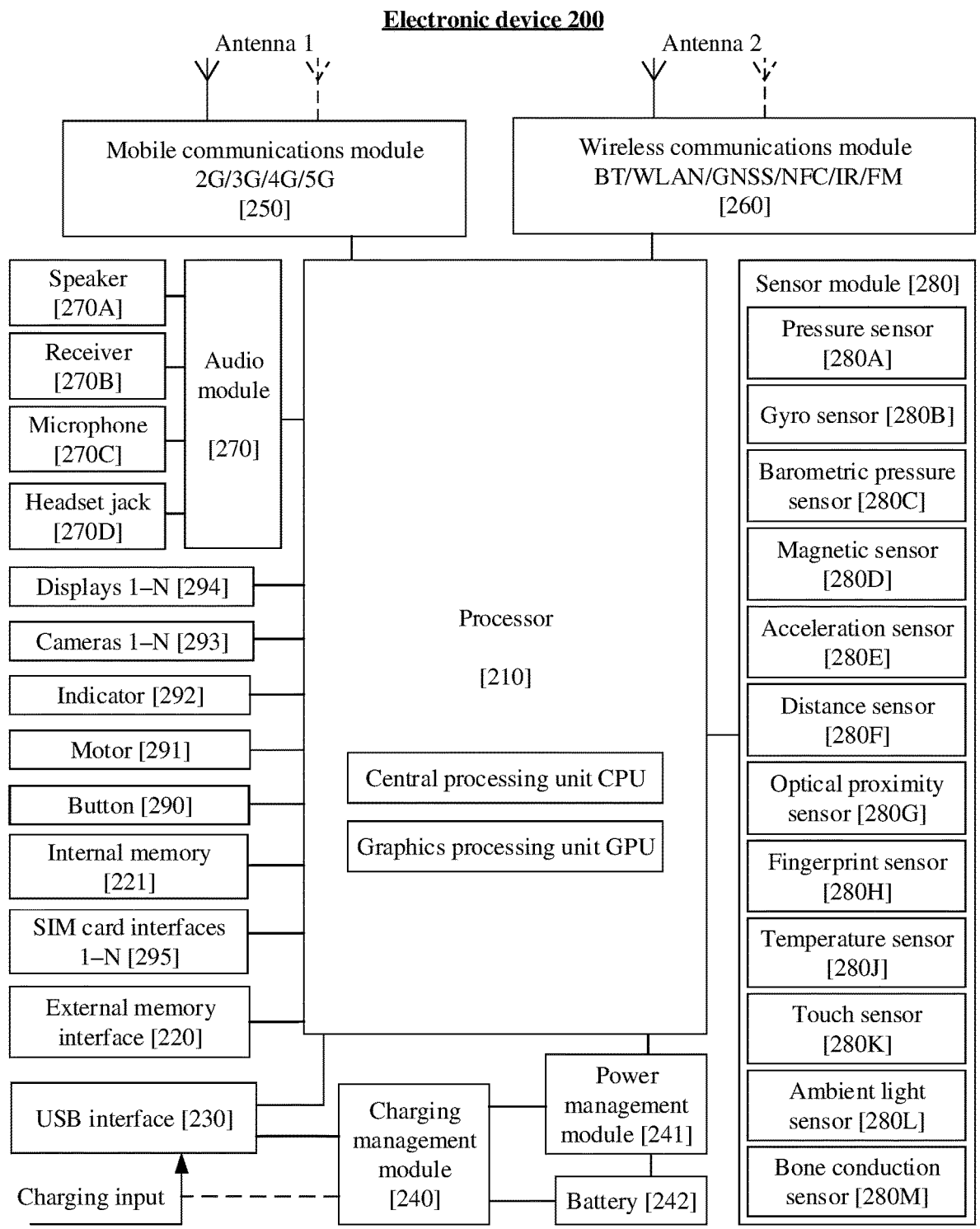
FIG. 2 is a schematic diagram of a structure of an electronic device in an image bloom processing method according to an embodiment of this application.

FIG. 2 is a schematic diagram of a structure of an electronic device 200 in an image bloom processing method according to an embodiment of this application. The electronic device 200 may be but is not limited to a laptop computer, a desktop computer, a mobile phone, a smartphone, a tablet computer, a multimedia player, an e-reader, a smart vehicle-mounted device, a smart household appliance, an artificial intelligence device, a wearable device, an internet of things device, a virtual reality device/an augmented reality device/a mixed reality device, or the like.

The electronic device 200 may include a processor 210, an external memory interface 220, an internal memory 221, a universal serial bus (USB) interface 230, a charging management module 240, a power management module 241, a battery 242, an antenna 1, an antenna 2, a mobile communications module 250, a wireless communications module 260, an audio module 270, a speaker 270A, a receiver 270B, a microphone 270C, a headset jack 270D, a sensor module 280, a button 290, a motor 291, an indicator 292, a camera 293, a display 294, a subscriber identification module (SIM) card interface 295, and the like. The sensor module 280 may include a pressure sensor 280A, a gyroscope sensor 280B, a barometric pressure sensor 280C, a magnetic sensor 280D, an acceleration sensor 280E, a distance sensor 280F, an optical proximity sensor 280G, a fingerprint sensor 280H, a temperature sensor 280J, a touch sensor 280K, an ambient light sensor 280L, a bone conduction sensor 280M, and the like.

It may be understood that the structure shown in this embodiment of this application does not constitute a specific limitation on the electronic device 200. In some other embodiments of this application, the electronic device 200 may include more or fewer components than those shown in the figure, combine some components, split some components, or have different component arrangements. The components shown in the figure may be implemented by hardware, software, or a combination of software and hardware.

It may be understood that an interface connection relationship between modules illustrated in this embodiment of this application is merely an example for description, and does not constitute a limitation on the structure of the electronic device 200. In some other embodiments of this application, the electronic device 200 may alternatively use an interface connection manner (for example, a bus connection manner) that is different from that in the foregoing embodiment, or a combination of a plurality of interface connection manners.

The processor 210 may include one or more processing units. For example, the processor 210 includes a central processing unit (CPU) (for example, an application processor (AP)) and a graphics processing unit (GPU), and may further include a modem processor, an image signal processor (ISP), a microcontroller unit (MCU), a video codec, a digital signal processor (DSP), a baseband processor, and/or a neural network processing unit (NPU). Different processing units may be independent components, or may be integrated into one or more processors.

A memory may be further disposed in the processor 210, and is configured to store instructions and data. In some embodiments, the memory in the processor 210 is a cache memory. The memory may store instructions or data that have/has just been used or are/is cyclically used by the processor 210. If the processor 210 needs to use the instructions or the data again, the processor 210 may directly invoke the instructions or the data from the memory. This avoids repeated access and reduces a waiting time of the processor 210. Therefore, system efficiency is improved.

In some embodiments, the processor 210 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

The I2C interface is a two-way synchronization serial bus, and includes a serial data line (SDA) and a serial clock line (SCL). In some embodiments, the processor 210 may include a plurality of groups of I2C buses. The processor 210 may be coupled to the touch sensor 280K, a charger, a flash, the camera 293, and the like through different I2C bus interfaces. For example, the processor 210 may be coupled to the touch sensor 280K through the I2C interface, so that the processor 210 communicates with the touch sensor 280K through the I2C bus interface, to implement a touch function of the electronic device 200.

The I2S interface may be configured to perform audio communication. In some embodiments, the processor 210 may include a plurality of groups of I2S buses. The processor 210 may be coupled to the audio module 270 through the I2S bus, to implement communication between the processor 210 and the audio module 270. In some embodiments, the audio module 270 may transfer an audio signal to the wireless communications module 260 through the I2S interface, to implement a function of answering a call by using a Bluetooth headset.

The PCM interface may also be configured to: perform audio communication, and sample, quantize, and code an analog signal. In some embodiments, the audio module 270 may be coupled to the wireless communications module 260 through a PCM bus interface. In some embodiments, the audio module 270 may alternatively transfer an audio signal to the wireless communications module 260 through the PCM interface, to implement a function of answering a call by using a Bluetooth headset. Both the I2S interface and the PCM interface may be configured to perform audio communication.

The UART interface is a universal serial data bus, and is configured to perform asynchronous communication. The bus may be a two-way communications bus, and converts to-be-transmitted data between serial communication and parallel communication. In some embodiments, the UART interface is usually configured to connect the processor 210 and the wireless communications module 260. For example, the processor 210 communicates with a Bluetooth module in the wireless communications module 260 through the UART interface, to implement a Bluetooth function. In some embodiments, the audio module 270 may transfer an audio signal to the wireless communications module 260 through the UART interface, to implement a function of playing music by using a Bluetooth headset.

The MIPI interface may be configured to connect the processor 210 and a peripheral component such as the display 294 or the camera 293. The MIPI interface includes a camera serial interface (CSI), a display serial interface (DSI), or the like. In some embodiments, the processor 210 communicates with the camera 293 through the CSI interface, to implement a photographing function of the electronic device 200. The processor 210 communicates with the display 294 through the DSI interface, to implement a display function of the electronic device 200.

The GPIO interface may be configured by using software. The GPIO interface may be configured as a control signal, or may be configured as a data signal. In some embodiments, the GPIO interface may be configured to connect the processor 210 to the camera 293, the display 294, the wireless communications module 260, the audio module 270, the sensor module 280, or the like. The GPIO interface may be further configured as the I2C interface, the I2S interface, the UART interface, the MIPI interface, or the like.

The USB interface 230 is an interface that conforms to a USB standard specification, and may be specifically a Mini USB interface, a Micro USB interface, a USB Type-C interface, or the like. The USB interface 230 may be configured to connect to the charger to charge the electronic device 200, or may be configured to perform data transmission between the electronic device 200 and a peripheral device, may also be configured to connect to a headset to play audio through the headset. Alternatively, the interface may be used to connect to another electronic device, for example, an AR device.

The charging management module 240 is configured to receive a charging input from the charger. The charger may be a wireless charger or a wired charger. In some embodiments of wired charging, the charging management module 240 may receive a charging input of the wired charger through the USB interface 230. In some embodiments of wireless charging, the charging management module 240 may receive a wireless charging input by using a wireless charging coil of the electronic device 200. The charging management module 240 may further supply power to the electronic device through the power management module 241 while charging the battery 242.

The power management module 241 is configured to connect the battery 242 and the charging management module 240 to the processor 210. The power management module 241 receives input of the battery 242 and/or the charging management module 240, and supplies power to the processor 210, the internal memory 221, the display 294, the camera 293, the wireless communications module 260, and the like. The power management module 241 may be further configured to monitor parameters such as a battery capacity, a battery cycle count, and a battery health status (electric leakage or impedance). In some other embodiments, the power management module 241 may alternatively be disposed in the processor 210. In some other embodiments, the power management module 241 and the charging management module 240 may alternatively be disposed in a same device.

A wireless communications function of the electronic device 200 may be implemented through the antenna 1, the antenna 2, the mobile communications module 250, the wireless communications module 260, the modem processor, the baseband processor, and the like.

The antenna 1 and the antenna 2 are configured to transmit and receive electromagnetic wave signals. Each antenna in the electronic device 200 may be configured to cover one or more communications frequency bands. Different antennas may be further multiplexed, to improve antenna utilization. For example, the antenna 1 may be multiplexed as a diversity antenna in a wireless local area network. In some other embodiments, an antenna may be used in combination with a tuning switch.

The mobile communications module 250 can provide a wireless communication solution that is applied to the electronic device 200 and that includes 2G/3G/4G/5G, and the like. The mobile communications module 250 may include at least one filter, a switch, a power amplifier, a low noise amplifier (LNA), and the like. The mobile communications module 250 may receive an electromagnetic wave through the antenna 1, perform processing such as filtering or amplification on the received electromagnetic wave, and transfer the electromagnetic wave to the modem processor for demodulation. The mobile communications module 250 may further amplify a signal modulated by the modem processor, and convert the signal into an electromagnetic wave through the antenna 1 for radiation. In some embodiments, at least some function modules in the mobile communications module 250 may be disposed in the processor 210. In some embodiments, at least some function modules in the mobile communications module 250 may be disposed in a same device as at least some modules in the processor 210.

The modem processor may include a modulator and a demodulator. The modulator is configured to modulate a to-be-sent low-frequency baseband signal into a medium and high-frequency signal. The demodulator is configured to demodulate a received electromagnetic wave signal into a low-frequency baseband signal. Then, the demodulator transmits the low-frequency baseband signal obtained through demodulation to the baseband processor for processing. After being processed by the baseband processor, the low-frequency baseband signal is transferred to the application processor. The application processor outputs a sound signal by using an audio device (not limited to the speaker 270A, the receiver 270B, or the like), or displays an image or a video by using the display 294. In some embodiments, the modem processor may be an independent device. In some other embodiments, the modem processor may be independent of the processor 210, and is disposed in a same device as the mobile communications module 250 or another function module.

The wireless communications module 260 may provide a wireless communication solution that includes a wireless local area network (WLAN) (for example, a wireless fidelity (Wi-Fi) network), Bluetooth (BT), a global navigation satellite system (GNSS), frequency modulation (FM), a near field communication (NFC) technology, an infrared (IR) technology, or the like and that is applied to the electronic device 200. The wireless communications module 260 may be one or more devices that integrate at least one communications processing module. The wireless communications module 260 receives an electromagnetic wave through the antenna 2, performs frequency modulation and filtering processing on an electromagnetic wave signal, and sends a processed signal to the processor 210. The wireless communications module 260 may further receive a to-be-sent signal from the processor 210, perform frequency modulation and amplification on the signal, and convert the signal into an electromagnetic wave through the antenna 2 for radiation.

In some embodiments, the antenna 1 and the mobile communications module 250 in the electronic device 200 are coupled, and the antenna 2 and the wireless communications module 260 in the electronic device 200 are coupled, so that the electronic device 200 can communicate with a network and another device by using a wireless communications technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a BeiDou navigation satellite system (BDS), a quasi-zenith satellite system (QZSS), and/or a satellite-based augmentation system (SBAS).

The electronic device 200 implements a display function through the GPU, the display 294, the application processor, and the like. The GPU is a microprocessor for image processing, and is connected to the display 294 and the application processor. The GPU is configured to perform mathematical and geometric calculation, and render an image. The processor 210 may include one or more GPUs that execute program instructions to generate or change display information.

The display 294 is configured to display an image, a video, and the like. The display 294 includes a display panel. The display panel may be a liquid crystal display (LCD), an organic light-emitting diode (OLED), an active-matrix organic light-emitting diode or an active-matrix organic light-emitting diode (AMOLED), a flexible light-emitting diode (FLED), a Mini-LED, a micro-LED, a Micro-OLED, a quantum dot light-emitting diode (QLED), or the like. In some embodiments, the electronic device 200 may include one or N displays 294, where N is a positive integer greater than 1.

The electronic device 200 may implement a photographing function by using the ISP, the camera 293, the video codec, the GPU, the display 294, the application processor, and the like.

The ISP is configured to process data fed back by the camera 293. For example, during photographing, a shutter is pressed, light is transmitted to a photosensitive element of the camera through a lens, an optical signal is converted into an electrical signal, and the photosensitive element of the camera transmits the electrical signal to the ISP for processing, to convert the electrical signal into a visible image. The ISP may further perform algorithm optimization on noise, brightness, and complexion of the image. The ISP may further optimize parameters such as exposure and a color temperature of a photographing scenario. In some embodiments, the ISP may be disposed in the camera 293.

The camera 293 is configured to capture a static image or a video. An optical image of an object is generated through the lens, and is projected onto the photosensitive element. The photosensitive element may be a charge coupled device (CCD) or a complementary metal-oxide-semiconductor (CMOS) photoelectric transistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as RGB or YUV. In some embodiments, the electronic device 200 may include one or N cameras 293, where N is a positive integer greater than 1.

The digital signal processor is configured to process a digital signal, and may process another digital signal in addition to the digital image signal. For example, when the electronic device 200 selects a frequency, the digital signal processor is configured to perform Fourier transform and the like on frequency energy.

The video codec is configured to compress or decompress a digital video. The electronic device 200 may support one or more video codecs. In this way, the electronic device 200 can play or record videos in a plurality of coding formats, for example, moving picture experts group (MPEG)-1, MPEG-2, MPEG-3, and MPEG-4.

The NPU is a neural-network (NN) computing processor, quickly processes input information by referring to a structure of a biological neural network, for example, by referring to a transfer mode between human brain neurons, and may further continuously perform self-learning. An application such as intelligent cognition of the electronic device 200 may be implemented by using the NPU. The intelligent cognition application includes image recognition, facial recognition, speech recognition, text understanding, and the like.

The external memory interface 220 may be configured to connect to an external storage card such as a Micro SD card, to extend a storage capability of the electronic device 200. The external storage card communicates with the processor 210 through the external memory interface 220, to implement a data storage function. For example, files such as music and videos are stored in the external storage card.

The internal memory 221 may be configured to store computer-executable program code. The executable program code includes instructions. The internal memory 221 may include a program storage area and a data storage area. The program storage area may store an operating system, an application program required by at least one function (for example, a sound playing function or an image playing function), and the like. The data storage area may store data (for example, audio data or a phone book) created during use of the electronic device 200, and the like. In addition, the internal memory 221 may include a high-speed random access memory, for example, a double data rate synchronous dynamic random access memory (DDR), and may alternatively include a non-volatile memory, for example, at least one magnetic disk storage device, a flash storage device, or a universal flash storage (UFS). The processor 210 runs the instructions stored in the internal memory 221 and/or the instructions stored in the memory disposed in the processor, to perform various function applications and data processing of the terminal device 200.

The electronic device 200 can implement an audio function such as music playback or recording by using the audio module 270, the speaker 270A, the receiver 270B, the microphone 270C, the headset jack 270D, the application processor, and the like.

The audio module 270 is configured to convert digital audio information into an analog audio signal output, and is also configured to convert an analog audio input into a digital audio signal. The audio module 270 may be further configured to encode and decode an audio signal. In some embodiments, the audio module 270 may be disposed in the processor 210, or some function modules in the audio module 270 are disposed in the processor 210.

The speaker 270A, also referred to as a "loudspeaker", is configured to convert an audio electrical signal into a sound signal. The electronic device 200 may listen to music or answer a hands-free call by using the speaker 270A.

The receiver 270B, also referred to as an "earpiece", is configured to convert an audio electrical signal into a sound signal. When the electronic device 200 answers a call or receives voice information, the receiver 270B may be placed close to a human ear to listen to a voice.

The microphone 270C, also referred to as a "mike" or a "mic", is configured to convert a sound signal into an electrical signal. When making a call or sending voice information, a user may make a sound by approaching the microphone 270C through the mouth of the user, to input a sound signal to the microphone 270C. At least one microphone 270C may be disposed in the electronic device 200. In some other embodiments, two microphones 270C may be disposed in the electronic device 200, to collect a sound signal and further implement a noise reduction function. In some other embodiments, three, four, or more microphones 270C may alternatively be disposed in the electronic device 200, to collect a sound signal, reduce noise, identify a sound source, implement a directional recording function, and the like.

The headset jack 270D is configured to be connected to a wired headset. The headset jack 270D may be the USB interface 230, or may be a 3.5 mm open mobile electronic device platform (OMTP) standard interface or a cellular telecommunications industry association of the USA (CTIA) standard interface.

The pressure sensor 280A is configured to sense a pressure signal, and can convert the pressure signal into an electrical signal. In some embodiments, the pressure sensor 280A may be disposed on the display 294. There are many types of pressure sensors 280A such as a resistive pressure sensor, an inductive pressure sensor, and a capacitive pressure sensor. The capacitive pressure sensor may include at least two parallel plates made of conductive materials. Capacitance between electrodes changes when a force is performed on the pressure sensor 280A. The electronic device 200 determines pressure intensity based on the change of the capacitance. When a touch operation is performed on the display 294, the electronic device 200 detects intensity of the touch operation based on the pressure sensor 280A. The electronic device 200 may also calculate a touch location based on a detection signal of the pressure sensor 280A. In some embodiments, touch operations that are performed at a same touch location but have different touch operation intensity may correspond to different operation instructions. For example, when a touch operation whose touch operation intensity is less than a first pressure threshold is performed on a short message application icon, an instruction for viewing a short message is executed. When a touch operation whose touch operation intensity is greater than or equal to the first pressure threshold is performed on the short message application icon, an instruction for creating a short message is executed.

The gyroscope sensor 280B may be configured to determine a motion posture of the electronic device 200. In some embodiments, an angular velocity of the electronic device 200 around three axes (namely, x, y, and z axes) may be determined by using the gyroscope sensor 280B. The gyroscope sensor 280B may be used for image stabilization during photographing. For example, when the shutter is pressed, the gyroscope sensor 280B detects an angle at which the electronic device 200 jitters, obtains, through calculation based on the angle, a distance for which a lens module needs to compensate, and allows the lens to cancel the jitter of the electronic device 200 through reverse motion, to implement image stabilization. The gyroscope sensor 280B may also be used in navigation and somatic game scenarios.

The barometric pressure sensor 280C is configured to measure atmospheric pressure. In some embodiments, the electronic device 200 calculates an altitude by using a value of the atmospheric pressure measured by the barometric pressure sensor 280C, to assist positioning and navigation.

The magnetic sensor 280D includes a Hall sensor. The electronic device 200 may detect opening and closing of a flip cover by using the magnetic sensor 280D. In some embodiments, when the electronic device 200 is a flip phone, the electronic device 200 may detect opening and closing of a flip cover based on the magnetic sensor 280D. Further, a feature such as automatic unlocking upon opening of the flip cover is set based on a detected opening or closing state of the flip cover.

The acceleration sensor 280E may detect magnitude of accelerations in various directions (usually on three axes) of the electronic device 200, and may detect magnitude and a direction of the gravity when the electronic device 200 is still. The acceleration sensor 280E may be further configured to recognize a posture of an electronic device, and is used in screen switching between a landscape mode and a portrait mode, a pedometer, or another application.

The distance sensor 280F is configured to measure a distance. The electronic device 200 may measure the distance in an infrared or a laser manner. In some embodiments, in a photographing scenario, the electronic device 200 may measure the distance by using the distance sensor 280F to implement fast focusing.

For example, the optical proximity sensor 280G may include a light-emitting diode (LED) and an optical detector, for example, a photodiode. The light-emitting diode may be an infrared light-emitting diode. The electronic device 200 emits infrared light by using the light-emitting diode. The electronic device 200 detects infrared reflected light from a nearby object by using the photodiode. When sufficient reflected light is detected, the electronic device 200 may determine that there is an object near the electronic device 200. When insufficient reflected light is detected, the electronic device 200 may determine that there is no object near the electronic device 200. The electronic device 200 may detect, through the optical proximity sensor 280G, that the user holds the electronic device 200 close to an ear for a call, so that the electronic device 200 automatically turns off a screen to save power. The optical proximity sensor 280G may also be used in a smart cover mode or a pocket mode to automatically unlock or lock the screen.

The ambient light sensor 280L is configured to sense ambient light brightness. The electronic device 200 may adaptively adjust brightness of the display 294 based on the sensed ambient light brightness. The ambient light sensor 280L may also be configured to automatically adjust a white balance during photographing. The ambient light sensor 280L may also cooperate with the optical proximity sensor 280G to detect whether the electronic device 200 is in a pocket, to prevent an accidental touch.

The fingerprint sensor 280H is configured to collect a fingerprint. The electronic device 200 may use a feature of the collected fingerprint to implement fingerprint-based unlocking, application lock access, fingerprint-based photographing, fingerprint-based call answering, and the like.

The temperature sensor 280J is configured to detect a temperature. In some embodiments, the electronic device 200 executes a temperature processing policy by using the temperature detected by the temperature sensor 280J. For example, when the temperature reported by the temperature sensor 280J exceeds a threshold, the electronic device 200 lowers performance of a processor located near the temperature sensor 280J, to reduce power consumption and implement thermal protection. In some other embodiments, when the temperature is less than another threshold, the electronic device 200 heats the battery 242, to avoid a case in which the electronic device 200 is shut down abnormally due to a low temperature. In some other embodiments, when the temperature is less than still another threshold, the electronic device 200 boosts an output voltage of the battery 242, to avoid an abnormal shutdown caused by a low temperature.

The touch sensor 280K is also referred to as a "touch control device". The touch sensor 280K may be disposed on the display 294. The touch sensor 280K and the display 294 form a touchscreen, which is also referred to as a "touchscreen". The touch sensor 280K is configured to detect a touch operation performed on or near the touch sensor 280K. The touch sensor may transfer the detected touch operation to the application processor, to determine a type of a touch event. The display 294 may provide a visual output related to the touch operation. In some other embodiments, the touch sensor 280K may also be disposed on a surface of the electronic device 200 at a location different from that of the display 294.

The bone conduction sensor 280M may obtain a vibration signal. In some embodiments, the bone conduction sensor 280M may obtain a vibration signal of a vibration bone of a human vocal part. The bone conduction sensor 280M may also contact a body pulse to receive a blood pressure beating signal. In some embodiments, the bone conduction sensor 280M may also be disposed in the headset, to combine into a bone conduction headset. The audio module 270 may obtain a voice signal through parsing based on the vibration signal that is of the vibration bone of the vocal part and that is obtained by the bone conduction sensor 280M, to implement a voice function. The application processor may parse heart rate information based on the blood pressure beating signal obtained by the bone conduction sensor 280M, to implement a heart rate detection function.

In some other embodiments of this application, the electronic device 200 may alternatively use an interface connection manner that is different from that in the foregoing embodiment. For example, a part or all of the foregoing plurality of sensors are connected to the MCU, and then connected to the AP through the MCU.

The buttons 290 include a power button, a volume button, and the like. The button 290 may be a mechanical button, or may be a touch button. The electronic device 200 may receive a button input, and generate a button signal input related to a user setting and function control of the electronic device 200.

The motor 291 may generate a vibration prompt. The motor 291 may be configured to provide an incoming call vibration prompt, or may be configured to provide a touch vibration feedback. For example, touch operations performed on different applications (for example, photographing and audio playing) may correspond to different vibration feedback effects. The motor 291 may also provide different vibration feedback effects that correspond to touch operations performed on different areas of the display 294. Different application scenarios (for example, a time reminder, information receiving, an alarm clock, and a game) may also correspond to different vibration feedback effects. A touch vibration feedback effect may be further customized.

The indicator 292 may be an indicator light, and may be configured to indicate a charging status and a power change, or may be configured to indicate a message, a missed call, a notification, and the like.

The SIM card interface 295 is configured to connect to a SIM card. The SIM card may be inserted into the SIM card interface 295 or plugged from the SIM card interface 295, to come into contact with or be separated from the electronic device 200. The electronic device 200 may support two or N SIM card interfaces, where N is a positive integer greater than 2. The SIM card interface 295 may support a Nano SIM card, a Micro SIM card, a SIM card, and the like. A plurality of cards may be simultaneously inserted into a same SIM card interface 295. The plurality of cards may be of a same type or of different types. The SIM card interface 295 may also be compatible with different types of SIM cards. The SIM card interface 295 may also be compatible with the external storage card. The electronic device 200 interacts with a network through the SIM card, to implement functions such as calling and data communication. In some embodiments, the electronic device 200 uses an eSIM, namely, an embedded SIM card. The eSIM card may be embedded into the electronic device 200, and cannot be separated from the electronic device 200.

A software system of the electronic device 200 may use a layered architecture, an event-driven architecture, a microkernel architecture, a micro service architecture, or a cloud architecture. In embodiments of this application, an Android system with a layered architecture is used as an example to describe a software structure of the electronic device 200. Certainly, an operating system of the electronic device 200 may alternatively be another system such as an iOS system. This is not limited in this embodiment of this application.

Figure 3:
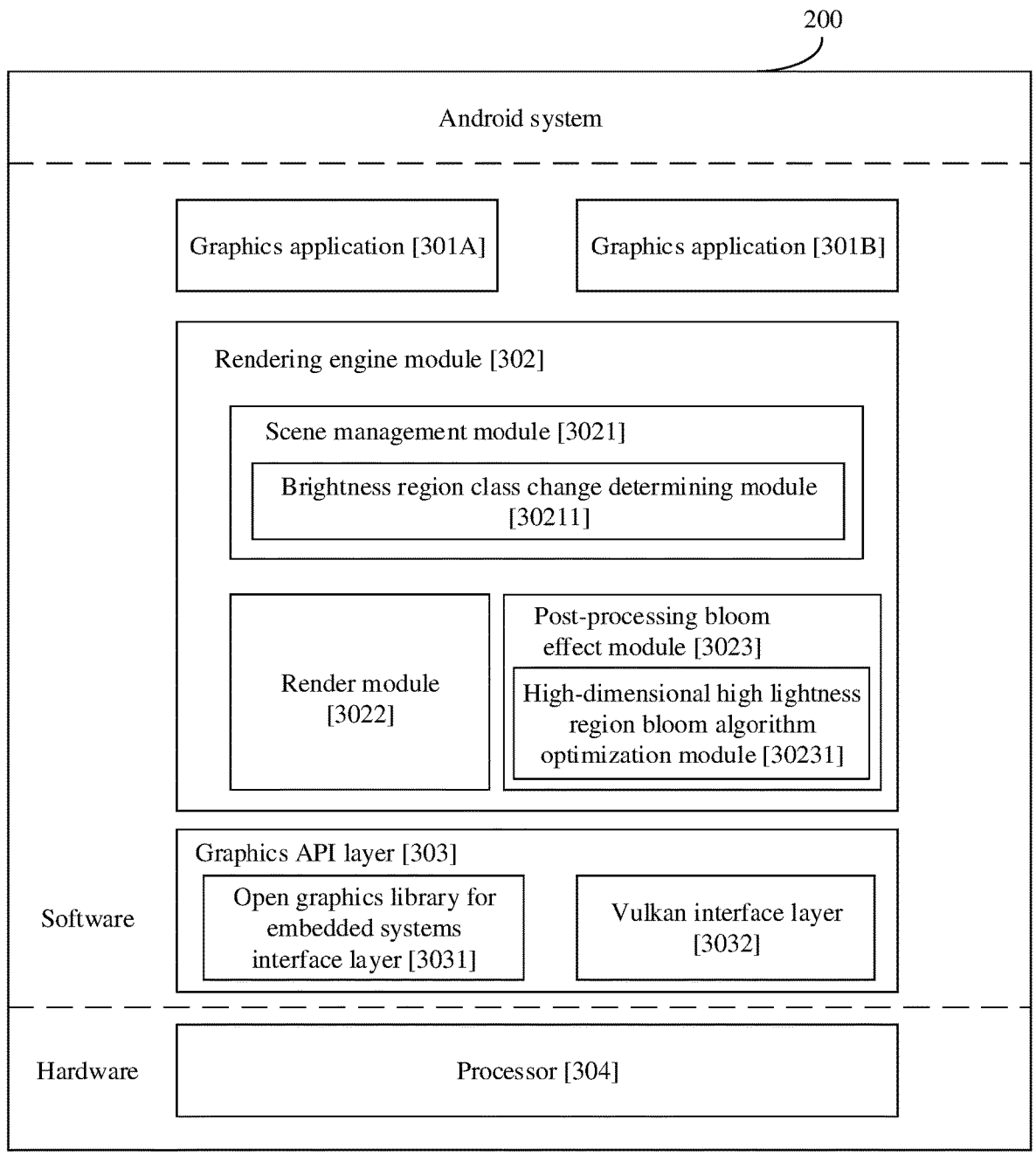
FIG. 3 is a schematic diagram of a form of an electronic device provided with reference to hardware and software according to an embodiment of this application.

For example, FIG. 3 is a schematic diagram of a form of an electronic device provided with reference to hardware and software according to an embodiment of this application. As shown in FIG. 3, the electronic device 200 includes an Android system, software, and hardware. The hardware includes a processor 304, for example, a GPU and a CPU. The software includes one or more graphics applications. For example, referring to FIG. 3, the software includes graphics applications 301A and 301B (collectively referred to as a graphics application 301), and the software further includes a rendering engine module 302 and a graphics application programing interface (API) layer 303. For example, the graphics application 301 in the software may include a game application and a 3D drawing application. A quantity of graphics applications in FIG. 3 is merely used as an example for description, and is not used as a limitation on the electronic device provided in this embodiment of this application.

Still referring to FIG. 3, the rendering engine module 302 includes a scene management module 3021, a renderer module 3022, and a post-processing bloom effect module 3023. The scene management module 3021 includes a brightness region class change determining module 30211. The scene management module 3021 includes a rendering engine interface. The post-processing bloom effect module 3023 includes a high-dimensional high lightness region bloom algorithm optimization module 30231. The graphics API layer 303 includes an open graphics library for embedded systems (OpenGL ES) interface layer 3031 and a Vulkan interface (a cross-platform drawing application programing interface) layer 3032. An OpenGL ES is a graphics library designed for embedded devices such as a mobile phone, a personal digital assistant (PDA), and a game console in an open system.

Figure 4:
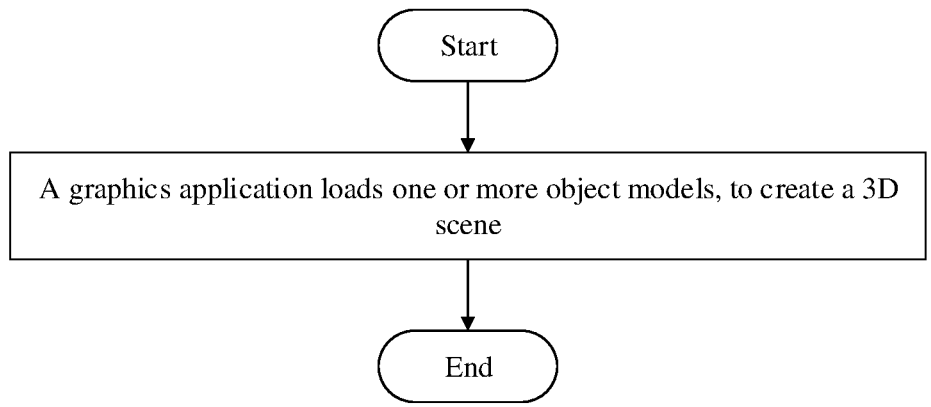
FIG. 4 is a schematic flowchart of creating a 3D scene according to an embodiment of this application.

As shown in FIG. 4, the graphics application loads one or more object models, to create a 3D scene.

That the graphics application 301 loads one or more object models is to obtain related data of the one or more object models. Related data of each object model includes status information of the object model. The graphics application 301 creates the 3D scene (which is also referred to as a rendering scene) based on status information of the one or more object models. Optionally, the status information of the object model may include position and posture information and surface material information. Optionally, the position and posture information of the object model includes a position of the object model, a posture of the object model, and a scaling coefficient of the object model. The scaling coefficient of the object model is a ratio of an original length of the object model in each axis direction to a displayed length in a corresponding axis direction. The surface material information of the object model includes color information of a surface material of the object model and map information of the surface material.

After creating the 3D scene, the graphics application 301 loads the one or more object models in the 3D scene to the rendering engine module 302 through the rendering engine interface.

Figure 5:
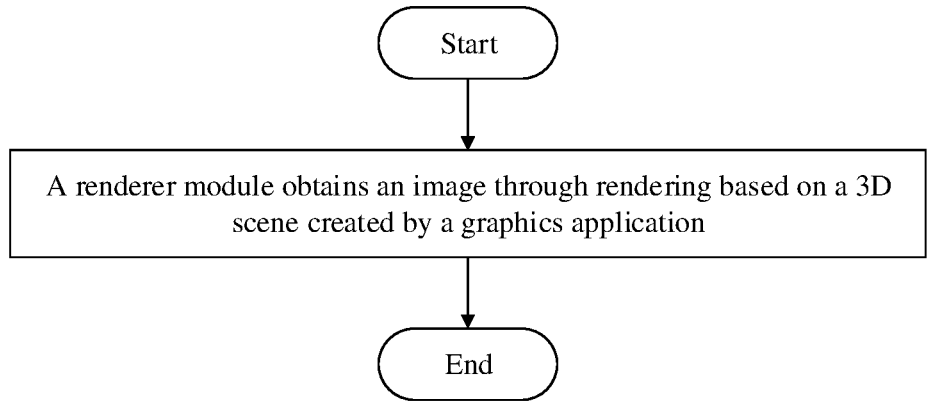
FIG. 5 is a schematic flowchart of obtaining an image through rendering based on a 3D scene created by a graphics application according to an embodiment of this application.

As shown in FIG. 5, the renderer module obtains an image through rendering based on the 3D scene created by the graphics application.

The renderer module 3022 obtains the one or more to-be-rendered object models in the 3D scene based on a camera parameter, and renders the one or more to-be-rendered object models, to obtain the image. The camera parameter includes a position parameter, a posture parameter, a view window parameter, and a field of view (FOV) parameter of a camera. The image obtained by the renderer module 3022 through rendering is an image without a bloom effect.

Functions of the scene management module 3021 shown in FIG. 3, the brightness region class change determining module 30211 included in the scene management module 3021, the post-processing bloom effect module 3023, and the high-dimensional high lightness region bloom algorithm optimization module 30231 included in the post-processing bloom effect module 3023 are described in the following method embodiments.

It should be understood that the software and the hardware shown in FIG. 2 and FIG. 3 are merely examples. In another embodiment, another type of software or hardware may be used.

Figure 6:
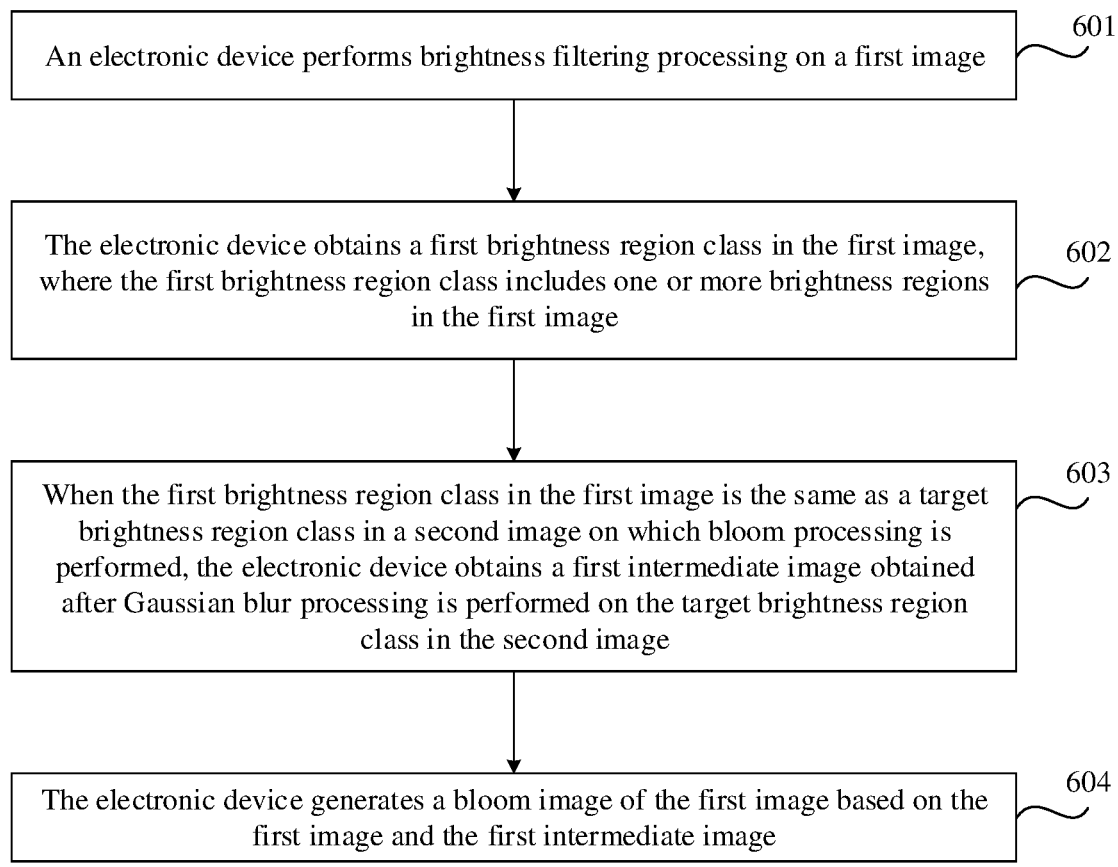
FIG. 6 is a flowchart of an image bloom processing method according to an embodiment of this application.

FIG. 6 is a flowchart of an image bloom processing method according to an embodiment of this application. The method may be applied to the electronic device shown in FIG. 2 or FIG. 3. As shown in FIG. 6, the method includes the following steps.

Step 601: The electronic device performs brightness filtering processing on a first image.

That the electronic device performs brightness filtering processing on a first image is to remove a pixel, in the first image, whose pixel value is less than a brightness threshold, to retain a pixel, in the first image, whose pixel value is greater than or equal to the brightness threshold. Optionally, the brightness threshold may be a fixed value, in other words, there may be a same brightness threshold for all images. Alternatively, the brightness threshold may be determined based on a pixel value of a pixel in the first image, and there may be different brightness thresholds for different images. The brightness threshold may be determined by the electronic device based on the pixel value of the pixel in the first image. Alternatively, the brightness threshold may be determined by another device based on the pixel value of the pixel in the first image, and sent to the electronic device. This is not limited in this embodiment of this application.

Optionally, a process of determining the brightness threshold based on the pixel value of the pixel in the first image includes: grouping pixels in the first image into a plurality of pixel value intervals based on pixel values, where there is no intersection set between any two of the plurality of pixel value intervals, and a union set of the plurality of pixel value intervals is a universal set of the pixel values; obtaining a target pixel value interval from the plurality of pixel value intervals, where a maximum value in the target pixel value interval is a first value, a minimum value in the target pixel value interval is a second value, and the following condition is met: a total quantity of pixels, in the first image, whose pixel values are less than the first value is greater than or equal to a preset quantity threshold, and a total quantity of pixels, in the first image, whose pixel values are less than the second value is less than the preset quantity threshold; and using the minimum value (namely, the second value), the maximum value (namely, the first value), an average value, or an intermediate value in the target pixel value range as the brightness threshold of the first image. Certainly, the brightness threshold of the first image may alternatively be another pixel value in the target pixel value interval. The preset quantity threshold may be 90% of a total quantity of pixels in the first image.

For example, it is assumed that the brightness threshold is the average value in the target pixel value interval, the total quantity of pixels in the first image is 1920×1080, the plurality of pixel value intervals are respectively [0, 7], [8, 15], [16, 23], [24, 31], . . . , [240, 247], and [248, 255], and quantities of pixels, in the first image, grouped into the plurality of pixel value intervals are sequentially 1280, 3840, 1920, 4800, . . . , 8640, 10368, and 2880. If a total quantity of all pixels in the pixel value intervals [0, 7], [8, 15], [16, 23], [24, 31], . . . , and [224, 231] is less than 90% of the total quantity of pixels in the first image, and a total quantity of all pixels in the pixel value intervals [0, 7], [8, 15], [16, 23], [24, 31], . . . , [224, 231], and [232, 239] is greater than or equal to 90% of the total quantity of pixels in the first image, the electronic device determines that the pixel value interval [232, 239] is the target pixel value interval, and may further calculate the brightness threshold (232+233+ . . . +238+ 239)/8=235.5.

Step 602: The electronic device obtains a first brightness region class in the first image, where the first brightness region class includes one or more brightness regions in the first image.

The first image may include one or more brightness region classes, and each brightness region class may include one or more different brightness regions in the first image. The brightness region may also be referred to as a high lightness region, and is a region whose brightness value is greater than or equal to the brightness threshold. For example, if the first image is obtained through rendering based on a first 3D scene, the one or more brightness regions may be high lightness regions on one or more object models in the first 3D scene. The first brightness region class may be any brightness region class in the first image.

Step 603: When the first brightness region class in the first image is the same as a target brightness region class in a second image on which bloom processing is performed, the electronic device obtains a first intermediate image obtained after Gaussian blur processing is performed on the target brightness region class in the second image.

Optionally, when the first image is obtained through rendering based on the first 3D scene, and the second image is obtained through rendering based on a second 3D scene, that the first brightness region class in the first image is the same as a target brightness region class in a second image includes: Status information of an object model corresponding to the brightness region in the first brightness region class in the first 3D scene is the same as status information of an object model corresponding to a brightness region in the target brightness region class in the second 3D scene, and a camera parameter in the first 3D scene is the same as a camera parameter in the second 3D scene.

Figure 7:
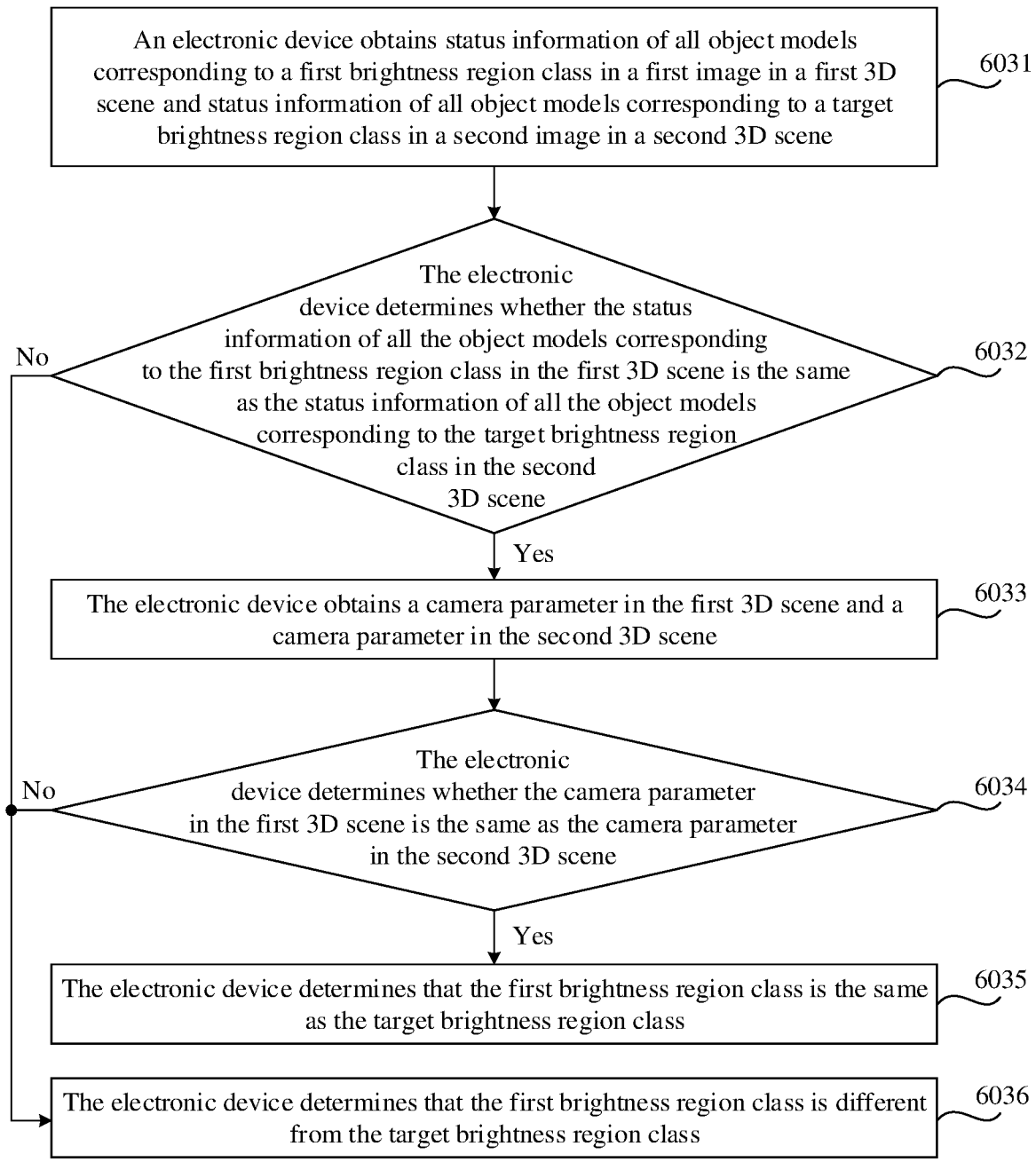
FIG. 7 is a flowchart of a method for determining whether a first brightness region class in a first image is the same as a target brightness region class in a second image according to an embodiment of this application.

Optionally, FIG. 7 is a flowchart of a method for determining whether the first brightness region class in the first image is the same as the target brightness region class in the second image according to an embodiment of this application. As shown in FIG. 7, the process includes the following steps.

Step 6031: The electronic device obtains status information of all object models corresponding to the first brightness region class in the first image in the first 3D scene and status information of all object models corresponding to the target brightness region class in the second image in the second 3D scene.

Optionally, the status information of the object model may include position and posture information and surface material information. The position and posture information may include a position of the object model, a posture of the object model, and a scaling coefficient of the object model. The surface material information may include color information of a surface material of the object model and map information of the surface material.

For example, it is assumed that the first brightness region class in the first image includes a brightness region a, a brightness region b, and a brightness region c. The brightness region a is a high lightness region of a wall A, the brightness region b is a high lightness region of a mountain B, and the brightness region c is a high lightness region of a sky C. In this case, the electronic device obtains status information of the wall A, the mountain B, and the sky C in each of the first 3D scene and the second 3D scene.

Step 6032: The electronic device determines whether the status information of all the object models corresponding to the first brightness region class in the first 3D scene is the same as the status information of all the object models corresponding to the target brightness region class in the second 3D scene. When the status information of all the object models corresponding to the first brightness region class is the same as the status information of all the object models corresponding to the target brightness region class, the electronic device performs step 6033. When the status information of all the object models corresponding to the first brightness region class is not exactly the same as the status information of all the object models corresponding to the target brightness region class, the electronic device performs step 6036.

All object models corresponding to a brightness region class include an object model corresponding to each brightness region in the brightness region class. For ease of description, in this embodiment, the brightness region in the first brightness region class is referred to as a first brightness region, and the brightness region in the target brightness region class is referred to as a second brightness region. That the status information of all the object models corresponding to the first brightness region class in the first 3D scene is the same as the status information of all the object models corresponding to the target brightness region class in the second 3D scene means that the first brightness region in the first brightness region class is in a one-to-one correspondence with the second brightness region in the target brightness region class, and status information of an object model corresponding to each first brightness region is the same as status information of an object model corresponding to a corresponding second brightness region.

For example, refer to the example in step 6031. When status information of the wall A in the first 3D scene is the same as status information of the wall A in the second 3D scene, status information of the mountain B in the first 3D scene is the same as status information of the mountain B in the second 3D scene, and status information of the sky C in the first 3D scene is the same as status information of the sky C in the second 3D scene, the electronic device determines that the status information of all the object models corresponding to the first brightness region class in the first 3D scene is the same as the status information of all the object models corresponding to the target brightness region class in the second 3D scene. When the status information of the wall A in the first 3D scene is different from the status information of the wall A in the second 3D scene, the status information of the mountain B in the first 3D scene is different from the status information of the mountain B in the second 3D scene, and/or the status information of the sky C in the first 3D scene is different from the status information of the sky C in the second 3D scene, the electronic device determines that the status information of all the object models corresponding to the first brightness region class in the first 3D scene is not exactly the same as the status information of all the object models corresponding to the target brightness region class in the second 3D scene.

Step 6033: The electronic device obtains the camera parameter in the first 3D scene and the camera parameter in the second 3D scene.

Optionally, the camera parameter includes a position and posture parameter, a view window parameter, and an FOV parameter of a camera.

Step 6034: The electronic device determines whether the camera parameter in the first 3D scene is the same as the camera parameter in the second 3D scene. When the camera parameter in the first 3D scene is the same as the camera parameter in the second 3D scene, the electronic device performs step 6035. When the camera parameter in the first 3D scene is different from the camera parameter in the second 3D scene, the electronic device performs step 6036.

Step 6035: The electronic device determines that the first brightness region class is the same as the target brightness region class.

In this embodiment, when the first brightness region class in the first image is the same as the target brightness region class in the second image on which bloom processing is performed, the electronic device may directly obtain the first intermediate image obtained after Gaussian blur processing is performed on the target brightness region, and use the first intermediate image as an image obtained after Gaussian blur processing is performed on the first brightness region class in the first image. In this case, in a running process, the electronic device for which an image bloom processing function is enabled does not need to perform Gaussian blur processing on the first brightness region class in the first image. Therefore, running load of the electronic device is reduced, and power consumption of the electronic device is reduced.

Step 6036: The electronic device determines that the first brightness region class is different from the target brightness region class in the second image.

When the status information of all the object models corresponding to the first brightness region class is not exactly the same as the status information of all the object models corresponding to the target brightness region class, and/or the camera parameter in the first 3D scene is different from the camera parameter in the second 3D scene, the electronic device determines that the first brightness region class changes with respect to the target brightness region class, in other words, the electronic device determines that the first brightness region class is different from the target brightness region class in the second image.

Optionally, when the first brightness region class is different from the target brightness region class, the electronic device performs Gaussian blur processing on the first brightness region class in the first image, to obtain a corresponding intermediate image.

Optionally, step 6032 and step 6034 may be transposed. That is, the electronic device may perform step 6034 before step 6032, or step 6032 and step 6034 may be simultaneously performed. This is not limited in this embodiment of this application.

In this embodiment, that the first brightness region class in the first image is the same as a target brightness region class in a second image further includes: A quantity of brightness regions in the first brightness region class is the same as a quantity of brightness regions in the target brightness region class, and a type of the object model corresponding to the brightness region in the first brightness region class in the first 3D scene is the same as a type of the object model corresponding to the brightness region in the target brightness region class in the second 3D scene. The type of the object model may include a natural landscape (for example, a mountain and a sky), a building, a plant, an animal, and the like. In this case, the process of determining whether the first brightness region class in the first image is the same as the target brightness region class in the second image on which bloom processing is performed may further include: The electronic device determines whether the quantity of brightness regions in the first brightness region class is the same as the quantity of brightness regions in the target brightness region class, and whether the type of the object model corresponding to the brightness region in the first brightness region class in the first 3D scene is the same as the type of the object model corresponding to the brightness region in the target brightness region class in the second 3D scene.

Optionally, in this embodiment, the electronic device may first determine whether the quantity of brightness regions in the first brightness region class is the same as the quantity of brightness regions in the target brightness region class, and whether the type of the object model corresponding to the brightness region in the first brightness region class in the first 3D scene is the same as the type of the object model corresponding to the brightness region in the target brightness region class in the second 3D scene, and then performs step 6031 to step 6036 after determining that the quantity of brightness regions in the first brightness region class is the same as the quantity of brightness regions in the target brightness region class, and the type of the object model corresponding to the brightness region in the first brightness region class in the first 3D scene is the same as the type of the object model corresponding to the brightness region in the target brightness region class in the second 3D scene, to improve determining efficiency.

Optionally, when each of the first image and the second image is an image captured by a physical camera, the electronic device may obtain the target brightness region class in the second image after obtaining the first brightness region class in the first image, and compare the first brightness region class with a second brightness region class based on an image processing technology, to determine whether the first brightness region class is the same as the second brightness region class. Certainly, when each of the first image and the second image is an image obtained through rendering based on a 3D scene, whether the first brightness region class is the same as the second brightness region class may be determined in this manner. This is not limited in this embodiment of this application.

Step 604: The electronic device generates a bloom image of the first image based on the first image and the first intermediate image.

Optionally, the first image includes one or more brightness region classes.

In a first case, when the first image includes one brightness region class, in other words, the first image includes only the first brightness region class, an implementation process of step 604 includes: The electronic device performs image fusion processing on the first image and the first intermediate image, to obtain the bloom image of the first image.

In this embodiment, when the first image includes only the first brightness region class, and the first brightness region class is the same as the target brightness region class in the second image on which bloom processing is performed, the electronic device may obtain the first intermediate image obtained after Gaussian blur processing is performed on the target brightness region class, and generate the bloom image of the first image based on the first image and the first intermediate image. Gaussian blur processing does not need to be performed on the first image while a bloom effect of the first image is ensured, and therefore complexity of an image bloom processing process is significantly reduced, thereby reducing load of the electronic device in the running process after the bloom processing function is enabled, and reducing power consumption of the electronic device.

In a second case, when the first image includes a plurality of brightness region classes, the electronic device may perform step 602 to step 604 for each brightness region class in the first image, to obtain an intermediate image corresponding to each brightness region class. In this case, an implementation process of step 604 includes: The electronic device performs image fusion processing on the first image and the intermediate image corresponding to each brightness region class in the first image, to obtain the bloom image of the first image.

Optionally, there are a plurality of manners of dividing an image into brightness region classes. In this embodiment, two manners of obtaining the brightness region class through division are provided, and a process of performing, by the electronic device, bloom processing on the first image is described for different division manners by using an example in which the first image includes two brightness region classes (the first brightness region class and a second brightness region class). Each of the first brightness region class and the second brightness region class includes one or more brightness regions in the first image, and the brightness region in the first brightness region class is different from a brightness region in the second brightness region class. Certainly, the first image may alternatively include three, four, or more brightness region classes. This is not limited in this embodiment of this application.

In a first implementable manner, the brightness region class is obtained through division based on a size of a brightness region. A size of each brightness region in the first brightness region class is greater than a size of each brightness region in the second brightness region class. Alternatively, a size of each brightness region in the first brightness region class is less than a size of each brightness region in the second brightness region class. In this embodiment, description is provided by using an example in which the size of each brightness region in the first brightness region class is greater than the size of each brightness region in the second brightness region class.

Optionally, the electronic device may store a preset size threshold. When a ratio of a size of a brightness region to a size of the image is greater than the size threshold, the electronic device groups the brightness region into a brightness region class. When a ratio of a size of a brightness region to the size of the image is less than or equal to the size threshold, the electronic device groups the brightness region into another brightness region class. Optionally, a value of the size threshold may range from 3% to 5% of the size of the image. For example, the size threshold may be 3%, 4%, or 5% of the size of the image.

Figure 8:
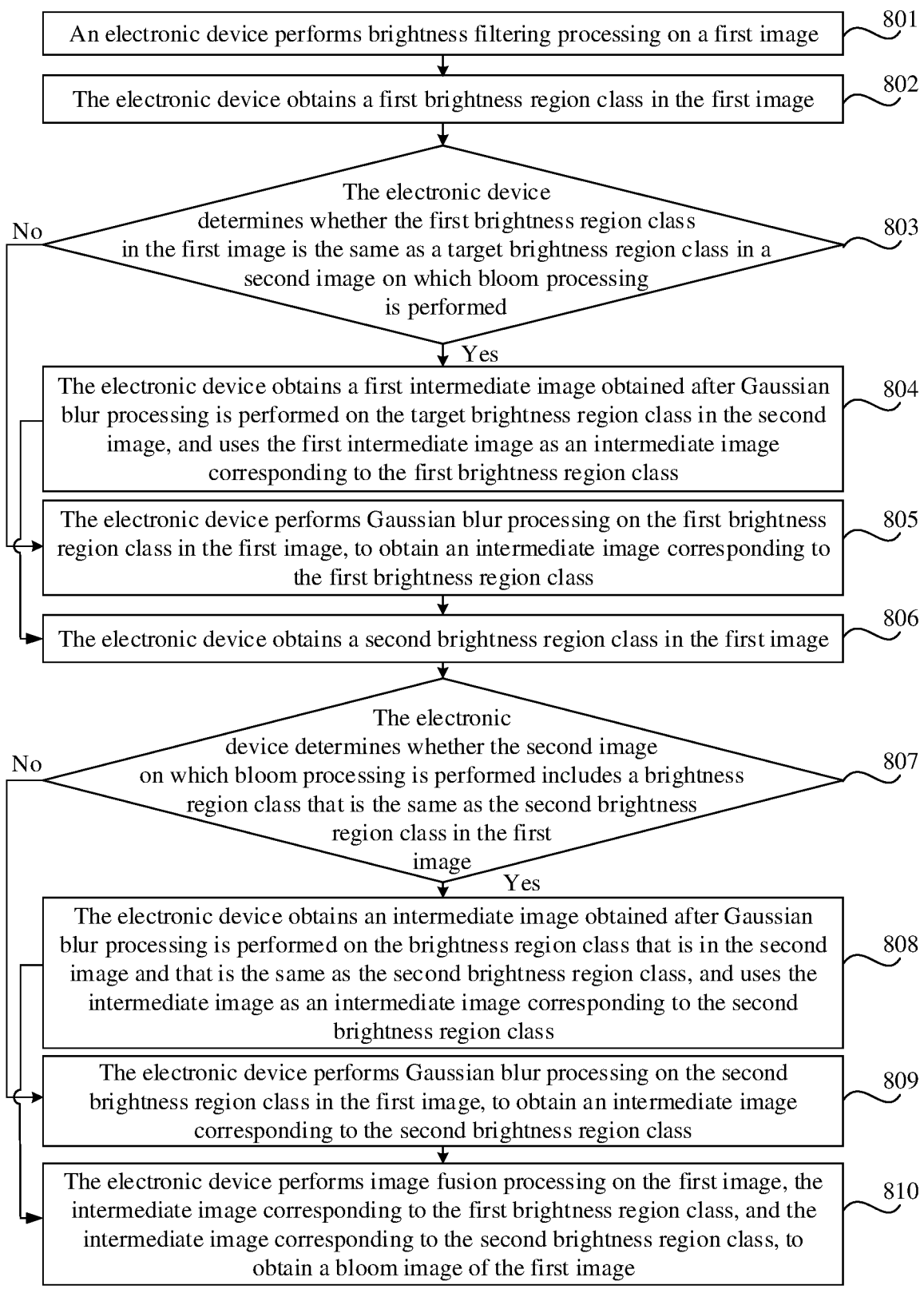
FIG. 8 is a flowchart of another image bloom processing method according to an embodiment of this application.

Optionally, FIG. 8 is a flowchart of another image bloom processing method according to an embodiment of this application. As shown in FIG. 8, the method includes the following steps.

Step 801: An electronic device performs brightness filtering processing on a first image.

For explanation of this step, refer to step 601.

Step 802: The electronic device obtains a first brightness region class in the first image.

Step 803: The electronic device determines whether the first brightness region class in the first image is the same as a target brightness region class in a second image on which bloom processing is performed. When the first brightness region class is the same as the target brightness region class, the electronic device performs step 804. When the first brightness region class is different from the target brightness region class, the electronic device performs step 805.

Optionally, after obtaining the first brightness region class in the first image, the electronic device determines the target brightness region class in the second image. The second image includes two brightness region classes, and a size of each brightness region in the target brightness region class is greater than a size of each brightness region in the other brightness region class in the second image.

Step 804: The electronic device obtains a first intermediate image obtained after Gaussian blur processing is performed on the target brightness region class in the second image, and uses the first intermediate image as an intermediate image corresponding to the first brightness region class.

For explanation of step 803 and step 804, refer to step 603. After performing step 804, the electronic device performs step 806.

Step 805: The electronic device performs Gaussian blur processing on the first brightness region class in the first image, to obtain an intermediate image corresponding to the first brightness region class.

In this embodiment, a size of each brightness region in the first brightness region class in the first image is greater than a size of each brightness region in a second brightness region class. Therefore, the performing Gaussian blur processing on the first brightness region class may be considered as performing Gaussian blur processing on a large-size brightness region in the first image. In this case, the electronic device may perform reduction processing on resolution of the first image by using a relatively small reduction ratio, to remove a pixel in a brightness region (namely, a brightness region in a detail part) of a relatively small size in the first image, and retain a pixel only in a brightness region (namely, a high-dimensional brightness region) of a relatively large size, so that the electronic device conveniently performs Gaussian blur processing on the large-size brightness region (the first brightness region class) in the first image.

For example, a process of performing Gaussian blur processing on the first brightness region class in the first image may include: The electronic device first performs pixel reduction sampling processing on the first image by using a second reduction ratio, to obtain a second reduced image for the first brightness region class; and then performs Gaussian blur processing on the second reduced image, to obtain the intermediate image corresponding to the first brightness region class. The second reduction ratio k2 may meet the following condition: $k2=2^m$, m is an integer, and $m \leftarrow 3$. In this embodiment, the second reduction ratio may be a single reduction ratio or a set of a plurality of reduction ratios. For example, a value of m may be −4 or −5. In this case, the second reduction ratio k2 includes 1/16 and 1/32.

Optionally, when the second reduction ratio includes two reduction ratios, the process of performing Gaussian blur processing on the first brightness region class in the first image includes: The electronic device performs pixel reduction sampling processing on the first image by using the two different reduction ratios, to obtain two reduced images for the first brightness region class; and then the electronic device performs Gaussian blur processing on each of the two reduced images, to obtain two intermediate images. In this embodiment, the two reduction ratios included in the second reduction ratio may be 1/16 and 1/32.

Step 806: The electronic device obtains the second brightness region class in the first image.

Step 807: The electronic device determines whether the second image on which bloom processing is performed includes a brightness region class that is the same as the second brightness region class in the first image. When the second image on which bloom processing is performed includes a brightness region class that is the same as the second brightness region class in the first image, the electronic device performs step 808. When any brightness region class in the second image on which bloom processing is performed is different from the second brightness region class in the first image, the electronic device performs step 809.

Optionally, after obtaining the second brightness region class in the first image, the electronic device obtains a brightness region class, of a relatively small size, included in the second image, and determines whether the second brightness region class is the same as the brightness region class of a relatively small size.

Step 808: The electronic device obtains an intermediate image obtained after Gaussian blur processing is performed on the brightness region class that is in the second image and that is the same as the second brightness region class, and uses the intermediate image as an intermediate image corresponding to the second brightness region class.

For explanation of step 807 and step 808, refer to step 603. After performing step 808, the electronic device performs step 810.

Step 809: The electronic device performs Gaussian blur processing on the second brightness region class in the first image, to obtain an intermediate image corresponding to the second brightness region class.

In this embodiment, the intermediate image obtained by performing Gaussian blur processing on the second brightness region class in the first image by the electronic device is referred to as a second intermediate image. The size of each brightness region in the second brightness region class in the first image is less than the size of each brightness region in the first brightness region class. Therefore, the performing Gaussian blur processing on the second brightness region class may be considered as performing Gaussian blur processing on a small-size brightness region in the first image. In this case, the electronic device may perform reduction processing on the resolution of the first image by using a relatively large reduction ratio, and may retain the pixel in the brightness region (namely, the brightness region in the detail part) of a relatively small size in the first image, to perform bloom processing on the small-size brightness region in the first image. In addition, the brightness region of a relatively small size in the first image may be retained after the electronic device performs reduction processing on the resolution of the first image by using the relatively large reduction ratio.

Therefore, Gaussian blur processing may be performed on a first reduced image by using a convolution kernel of a small size. A larger size of the convolution kernel indicates higher complexity of Gaussian blur processing. Therefore, in this embodiment, there is relatively low complexity because Gaussian blur processing is performed by using the convolution kernel of a small size, and there is relatively low complexity for an image bloom processing process.

For example, a process of performing Gaussian blur processing on the second brightness region class in the first image may include: The electronic device first performs pixel reduction sampling processing on the first image by using a first reduction ratio, to obtain the first reduced image for the second brightness region class; and then performs Gaussian blur processing on the first reduced image, to obtain the second intermediate image. The first reduction ratio k1 may meet the following condition: $k1=2^m$, m is an integer, and $-3 \le n \le 0$. In this embodiment, the first reduction ratio may be a single reduction ratio or a set of a plurality of reduction ratios. For example, a value of n may be −2 or −3. In this case, the first reduction ratio k1 includes ¼ and ⅛.

Optionally, when the first reduction ratio includes two reduction ratios, the process of performing Gaussian blur processing on the second brightness region class in the first image includes: The electronic device performs pixel reduction sampling processing on the first image by using the two different reduction ratios, to obtain two reduced images for the second brightness region class; and then the electronic device performs Gaussian blur processing on each of the two reduced images, to obtain two intermediate images. In this embodiment, the two reduction ratios included in the first reduction ratio may be ¼ and ⅛.

Step 810: The electronic device performs image fusion processing on the first image, the intermediate image corresponding to the first brightness region class, and the intermediate image corresponding to the second brightness region class, to obtain a bloom image of the first image.

Optionally, the electronic device may not perform step 807 or step 808. That is, after performing step 806, the electronic device may directly perform Gaussian blur processing on the second brightness region class in the first image, to obtain the second intermediate image, so as to ensure a bloom effect of the first image.

In a second implementable manner, the brightness region class is obtained through division based on a type of an object model corresponding to a brightness region in the image in a 3D scene.

In a 3D scene such as a game or an animation, there is usually a foreground class object model (which is also referred to as a role foreground) and a background class object model (which is also referred to as a background object). The foreground class object model usually has features such as movability, a small size, and a relatively high frequency of change in a plurality of consecutive frames of images. For example, the foreground class object model includes an object model such as a character or an animal. The foreground class object model is usually relatively small in size, and therefore it may be considered that a high lightness region on the foreground class object model is usually relatively small in size, in other words, most high lightness regions on the foreground class object model are detail parts of a relatively small size. The background class object model usually has features such as immovability, a relatively large size, and a low frequency of change in a plurality of consecutive frames of images. For example, the background class object model includes an object model such as a sky, a mountain, and a building. The background class object model is usually relatively large in size, and therefore it may be considered that a high lightness region on the background class object model is usually relatively large in size, in other words, most high lightness regions on the background class object model are high-dimensional parts of a relatively large size.

Figure 9:
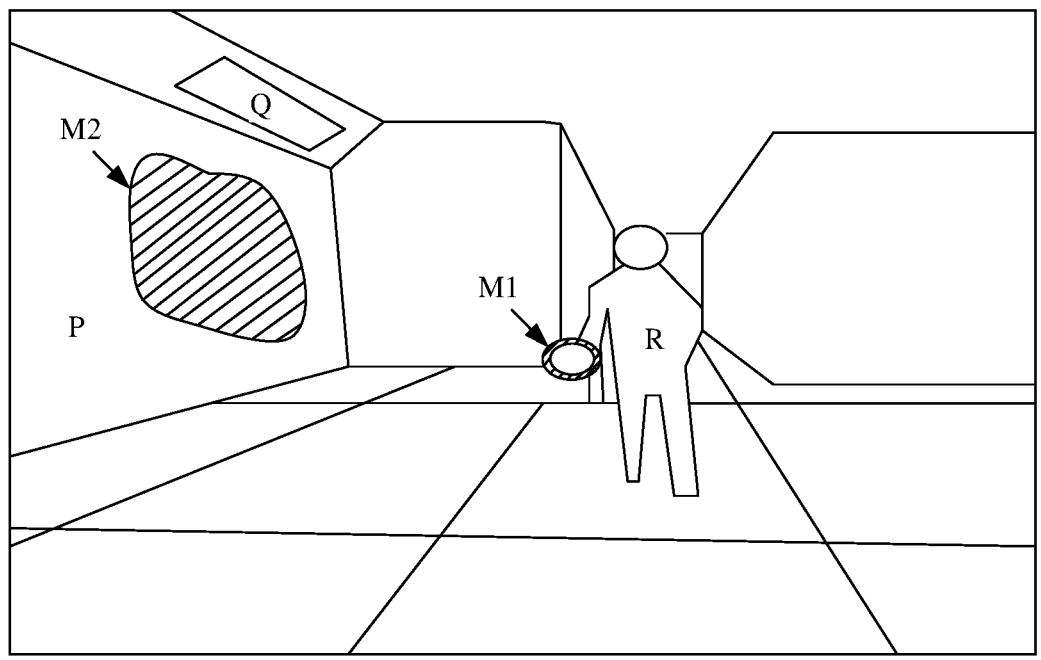
FIG. 9 is a schematic diagram of a 3D game interface according to an embodiment of this application.

For example, FIG. 9 is a schematic diagram of a 3D game interface (namely, a frame of image) according to an embodiment of this application. As shown in FIG. 9, a 3D scene corresponding to the 3D game interface includes at least a character R that is a foreground class object model and a house wall P and an illumination lamp Q that are background class object models. Light emitted by the illumination lamp Q illuminates the character R and the house wall P. Light that illuminates the character R converges into a fluorescent ring, and forms a high lightness region M1 (namely, a shadow region on the character R in the figure) of a relatively small size on the character R. Light that illuminates the house wall P forms a brightness region M2 (a shadow region on the wall house Pin the figure) of a relatively large size on the house wall P.

The background class object model has the feature of a relatively low frequency of change in a plurality of consecutive frames of images. Therefore, in an image obtained through rendering based on a 3D scene, there is a relatively high probability that a brightness region corresponding to the background class object model in the current frame of image is the same as a brightness region in a previous frame of image on which bloom processing is performed. Therefore, in this embodiment, before bloom processing is performed on the current frame of image, it may be first determined whether a background class object model in the 3D scene corresponding to the current frame of image changes with respect to a background class object model in a 3D scene corresponding to the previous frame of image. If there is no change, Gaussian blur processing does not need to be performed on the brightness region corresponding to the background class object model in the current frame of image, and an intermediate image obtained after Gaussian blur processing is performed on the brightness region corresponding to the background class object model in the previous frame of image is directly obtained. In this way, a quantity of times Gaussian blur processing is performed on the image may be reduced, and therefore complexity of an image bloom processing process is reduced.

In this embodiment, the electronic device may use a set that includes background class brightness regions, in the image, corresponding to all background class object models in the 3D scene as the first brightness region class. In other words, the first brightness region class includes the background class brightness regions corresponding to all the background class object models in the 3D scene corresponding to the image, and the first brightness region class may also be referred to as a background class. A set that includes brightness regions, in the image, corresponding to object models other than the background class object model in the 3D scene is used as the second brightness region class. In other words, the second brightness region class includes brightness regions other than the background class brightness region in the image. The object models other than the background class object model include the foreground class object model. The second brightness region class may also be referred to as a foreground class, and the brightness region in the second brightness region class may be referred to as a foreground class brightness region.

Figure 10:
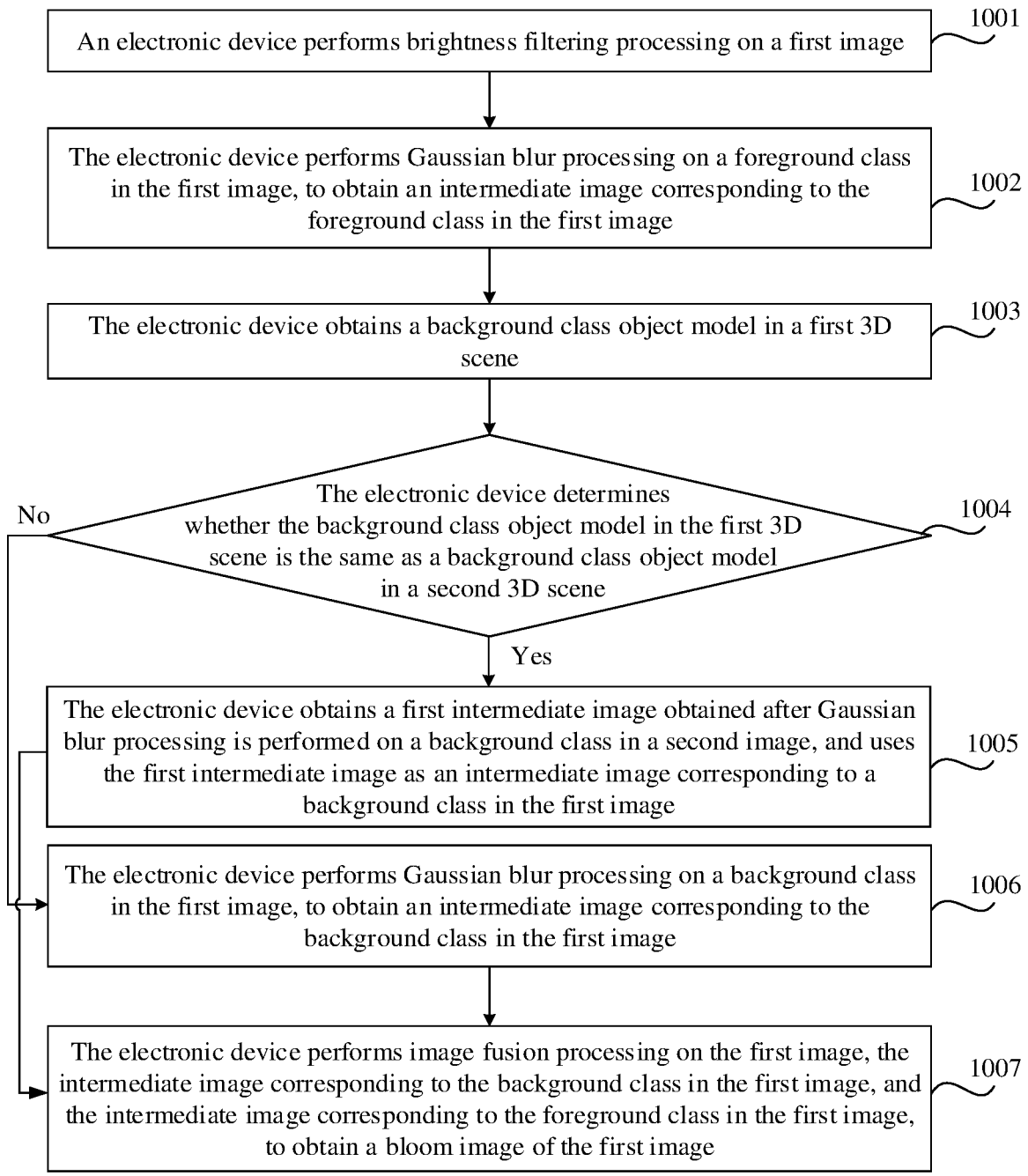
FIG. 10 is a flowchart of still another image bloom processing method according to an embodiment of this application.

Optionally, FIG. 10 is a flowchart of still another image bloom processing method according to an embodiment of this application. As shown in FIG. 10, the method includes the following steps.

Step 1001: An electronic device performs brightness filtering processing on a first image.

For explanation of this step, refer to step 601.

Step 1002: The electronic device performs Gaussian blur processing on a foreground class in the first image, to obtain an intermediate image corresponding to the foreground class in the first image.

In this embodiment, the intermediate image obtained by performing Gaussian blur processing on the foreground class in the first image by the electronic device is referred to as a second intermediate image. A size of a brightness region in the foreground class is usually less than a size of a brightness region in a background class. For a manner of performing, by the electronic device, Gaussian blur processing on the foreground class in the first image, refer to the process of performing Gaussian blur processing on the small-size brightness region in step 809.

Step 1003: The electronic device obtains a background class object model in a first 3D scene.

The first image is obtained through rendering based on the first 3D scene. Optionally, when an image is obtained through rendering based on a 3D scene, it may be determined whether a background class object model in a 3D scene corresponding to the image is the same as a background class object model in a 3D scene corresponding to an image on which bloom processing is performed, to determine whether a background class in the image is the same as a background class in the image on which bloom processing is performed. Therefore, a step of obtaining, by the electronic device, the background class in the image may be replaced with the following step of obtaining, by the electronic device, the background class object model in the 3D scene corresponding to the image.

Optionally, a process of obtaining, by the electronic device, the background class object model in the first 3D scene may include: The electronic device traverses labels of all object models in the first 3D scene, to obtain all background class object models in the first 3D scene. A first brightness region class includes background class brightness regions corresponding to all the background class object models in the first image. The label is used to indicate whether the object model is a background class object model. In this embodiment, optionally, each object model in the 3D scene may carry a label, and the label is used to indicate that the object model is a background class object model or a foreground class object model. The label may be manually labeled, or may be automatically classified by the electronic device based on a type of the object model. The label may be represented by using a value, a letter, a character string, or the like. For example, when a label of an object model is "0", it indicates that the object model is a background class object model. When a label of an object model is "1", it indicates that the object model is a foreground class object model.

Step 1004: The electronic device determines whether the background class object model in the first 3D scene is the same as a background class object model in a second 3D scene. When the background class object model in the first 3D scene is the same as the background class object model in the second 3D scene, the electronic device performs step 1005. When the background class object model in the first 3D scene is different from the background class object model in the second 3D scene, the electronic device performs step 1006.

That the electronic device determines whether the background class object model in the first 3D scene is the same as a background class object model in a second 3D scene is to determine whether the background class object model in the first 3D scene changes with respect to the background class object model in the second 3D scene.

Step 1005: The electronic device obtains a first intermediate image obtained after Gaussian blur processing is performed on a background class in a second image, and uses the first intermediate image as an intermediate image corresponding to the background class in the first image. The second image is obtained through rendering based on the second 3D scene. When the background class object model in the first 3D scene is the same as the background class object model in the second 3D scene, the electronic device determines that the background class object model in the first 3D scene corresponding to the first image does not change with respect to the background class object model in the second 3D scene corresponding to the second image, and therefore it may be considered that the background class in the first image is the same as the background class in the second image.

In this embodiment, a process of determining, by the electronic device, whether the background class object model in the first 3D scene is the same as the background class object model in the second 3D scene is the same as the process of determining, by the electronic device, whether the first brightness region class in the first image is the same as the target brightness region class in the second image in step 603. Therefore, for explanation of step 1004 and step 1005, refer to step 603. After performing step 1005, the electronic device performs step 1007.

Step 1006: The electronic device performs Gaussian blur processing on the background class in the first image, to obtain an intermediate image corresponding to the background class in the first image.

When the background class object model in the first 3D scene is different from the background class object model in the second 3D scene, the electronic device determines that the background class object model in the first 3D scene corresponding to the first image changes with respect to the background class object model in the second 3D scene corresponding to the second image, and therefore it may be considered that the background class in the first image is different from the background class in the second image. In this embodiment, the size of the brightness region in the background class is usually greater than the size of the brightness region in the foreground class. Therefore, for a manner of performing, by the electronic device, Gaussian blur processing on the background class in the first image, refer to the process of performing Gaussian blur processing on the large-size brightness region in step 805.

Step 1007: The electronic device performs image fusion processing on the first image, the intermediate image corresponding to the background class in the first image, and the intermediate image corresponding to the foreground class in the first image, to obtain a bloom image of the first image.

In this embodiment, step 1003 may be performed before step 1001, or may be simultaneously performed with step 1001. For example, when obtaining the first image through rendering based on the first 3D scene, the electronic device determines whether the background class object model in the first 3D scene is the same as the background class object model in the second 3D scene. Alternatively, when performing brightness filtering processing on the first image, the electronic device determines whether the background class object model in the first 3D scene is the same as the background class object model in the second 3D scene.

Optionally, in still another image bloom processing method provided in an embodiment of this application, the electronic device may further determine whether a foreground class object model in the first 3D scene is the same as a foreground class object model in the second 3D scene, so that when the foreground class object model in the first 3D scene is the same as the foreground class object model in the second 3D scene, the electronic device obtains an intermediate image that corresponds to the foreground class in the first image and that is obtained after Gaussian blur processing is performed on a foreground class in the second image. When the foreground class object model in the first 3D scene is different from the foreground class object model in the second 3D scene, the electronic device performs step 1002 of performing Gaussian blur processing on the foreground class in the first image, to obtain the intermediate image corresponding to the foreground class in the first image. In this way, when the foreground class object model in the first 3D scene is the same as the foreground class object model in the second 3D scene, the intermediate image that corresponds to the foreground class in the first image and that is obtained after Gaussian blur processing is performed on the foreground class in the second image is obtained, and Gaussian blur processing does not need to be performed on the foreground class in the first image. Therefore, a quantity of times Gaussian blur processing is performed on the first image is reduced, and therefore complexity of an image bloom processing process is reduced.

Figure 11:
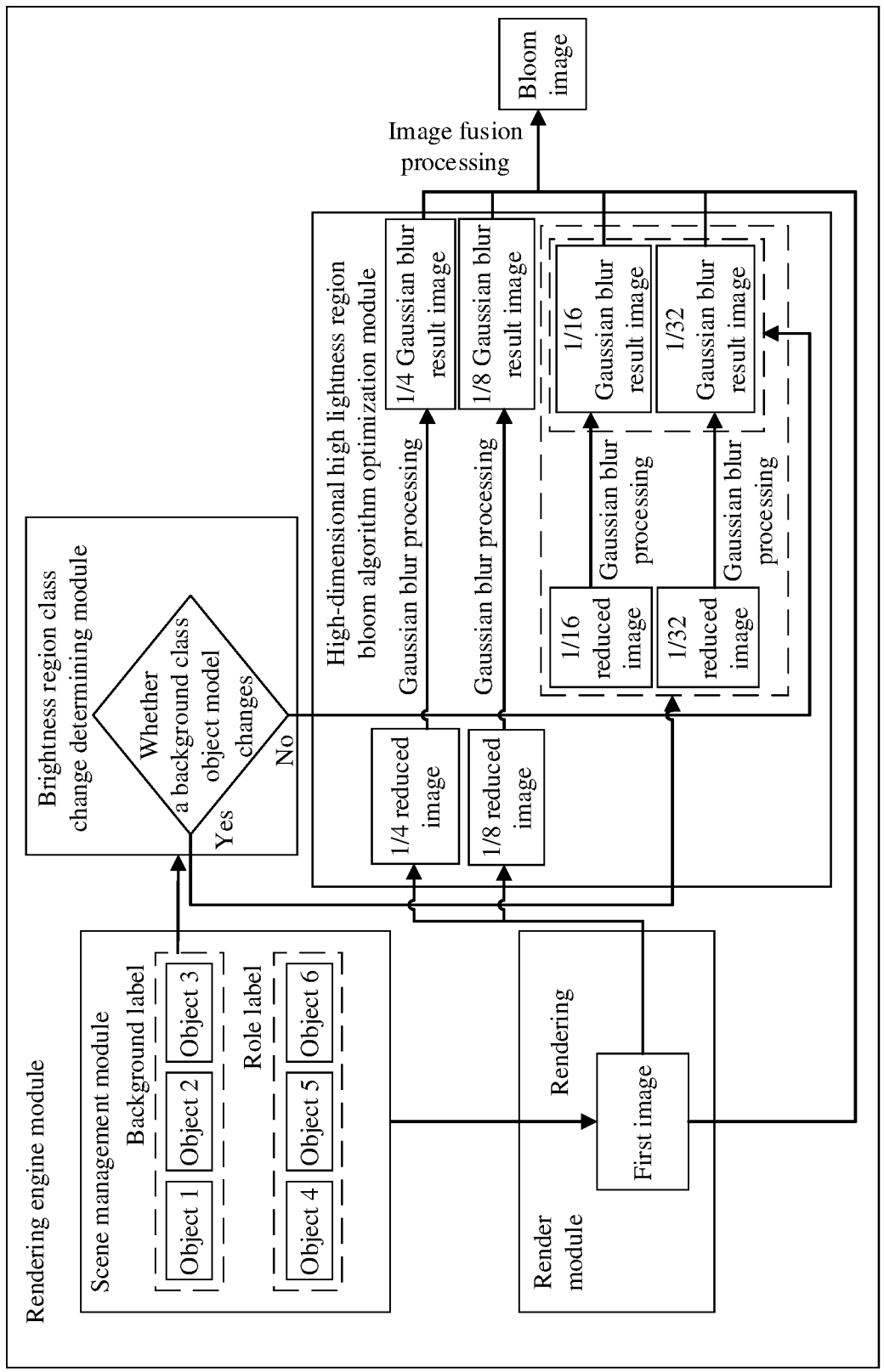
FIG. 11 is a schematic diagram of a procedure of implementing, by an electronic device, an image bloom processing method according to an embodiment of this application.

A process of implementing, by the electronic device, the image bloom processing method shown in FIG. 10 is described by using an example in the following embodiment of this application. For example, FIG. 11 is a schematic diagram of a procedure of implementing, by an electronic device, an image bloom processing method according to an embodiment of this application. As shown in FIG. 11, object models in a first 3D scene include an object 1, an object 2, an object 3, an object 4, an object 5, and an object 6. A label of each of the object 1, the object 2, and the object 3 is a background label, and the background label is used to indicate that the object model is a background class object model. A label of each of the object 4, the object 5, and the object 6 is a foreground label (which is also referred to as a role label), and the foreground label is used to indicate that the object model is a foreground class object model.

A scene management module in the electronic device stores all the object models in the first 3D scene.

A renderer module obtains a first image through rendering based on the first 3D scene.

A high-dimensional high lightness region bloom algorithm optimization module performs pixel reduction sampling processing on the first image by using a reduction ratio of ¼, to obtain a reduced image (a ¼ reduced image for short) whose resolution is ¼ times original resolution (resolution of the first image); then performs Gaussian blur processing on the ¼ reduced image, to obtain an intermediate image (a ¼ Gaussian blur result image for short) corresponding to a foreground class in the first image; performs pixel reduction sampling processing on the first image by using a reduction ratio of ⅛, to obtain a reduced image (a ⅛ reduced image for short) whose resolution is ⅛ times the original resolution; and then performs Gaussian blur processing on the ⅛ reduced image, to obtain another intermediate image (a ⅛ Gaussian blur result image for short) corresponding to the foreground class in the first image.

A brightness region class change determining module traverses the object 1 to the object 6 in the scene management module, determines the object 1 to the object 3 with the background label, and determines whether the object 1, the object 2, and the object 3 in the first 3D scene are respectively the same as background class object models in a second 3D scene. When the object 1, the object 2, and the object 3 in the first 3D scene are respectively the same as the background class object models in the second 3D scene, the high-dimensional high lightness region bloom algorithm optimization module obtains an intermediate image (namely, a 1/16 Gaussian blur result image and a 1/32 Gaussian blur result image shown in the figure) obtained after Gaussian blur processing is performed on a second image. When the object 1, the object 2, and the object 3 in the first 3D scene are different from the background class object models in the second 3D scene, the high-dimensional high lightness region bloom algorithm optimization module performs Gaussian blur processing on a background class in the first image, to obtain an intermediate image corresponding to the background class in the first image.

A process of performing, by the high-dimensional high lightness region bloom algorithm optimization module, Gaussian blur processing on the background class in the first image includes: The high-dimensional high lightness region bloom algorithm optimization module performs pixel reduction sampling processing on the first image by using a reduction ratio of 1/16, to obtain a reduced image (a 1/16 reduced image for short) whose resolution is 1/16 times the original resolution; then performs Gaussian blur processing on the 1/16 reduced image, to obtain an intermediate image (a 1/16 Gaussian blur result image for short) corresponding to the background class in the first image; performs pixel reduction sampling processing on the first image by using a reduction ratio of 1/32, to obtain a reduced image (a 1/32 reduced image for short) whose resolution is 1/32 times the original resolution; and then performs Gaussian blur processing on the 1/32 reduced image, to obtain another intermediate image (a 1/32 Gaussian blur result image for short) corresponding to the background class in the first image.

A process of performing, by the high-dimensional high lightness region bloom algorithm optimization module, the intermediate image obtained after Gaussian blur processing is performed on the second image includes: The high-dimensional high lightness region bloom algorithm optimization module directly obtains two intermediate images, namely, the 1/16 Gaussian blur result image and the 1/32 Gaussian blur result image, corresponding to a background class in the second image.

A rendering engine module performs image fusion processing on the first image, the 1/4 Gaussian blur result image, the 1/8 Gaussian blur result image, the 1/16 Gaussian blur result image, and the 1/32 Gaussian blur result image, to obtain a bloom image of the first image.

Refer to Table 1. It is assumed that the electronic device is a mobile terminal, and load statues of a CPU and a GPU and a system power consumption status that exist when the electronic device for which an image bloom processing function is enabled runs a game application (for example, a game application with a frame rate of 60) with relatively high picture quality by using an image bloom processing method (an algorithm in a related technology for short) provided in the related technology and load statuses of the CPU and the GPU and a system power consumption status that exist when the electronic device uses the image bloom processing method (an algorithm in this application for short) shown in FIG. 11 are recorded in Table 1.

TABLE 1

|  | Algorithm in the related technology | Algorithm in this application |
|---|---|---|
| Load increase rate of the GPU | 5% | 4% |
| Load increase rate of the CPU | 12% | 8% |
| Increase in power consumption (milliampere/mA) | 103 | 71 |

It may be learned from Table 1 that in a process in which the electronic device starts the related algorithm to run the game application, the load increase rate of the GPU in the electronic device is 5%, and the load increase rate of the CPU is 12%; in a process in which the electronic device starts the algorithm in this application to run the game application, the load increase rate of the GPU in the electronic device is 4%, and the load increase rate of the CPU is 8%; in the process in which the electronic device starts the related algorithm to run the game application, power consumption of the electronic device is increased by 103 mA; and in the process in which the electronic device starts the algorithm in this application to run the game application, power consumption of the electronic device is increased by 71 mA. Therefore, in comparison with the related technology, load and power consumption of the electronic device may be significantly reduced when the electronic device uses the image bloom processing method shown in FIG. 11.

In this embodiment, the steps in the image bloom processing method may be performed by same or different modules in the electronic device shown in FIG. 3.

For example, the rendering engine module 302 may be configured to perform step 601, step 801, and step 1001.

The high-dimensional high lightness region bloom algorithm optimization module 30231 may be configured to perform step 603, step 804, step 805, step 808, step 809, step 1002, step 1005, and step 1006.

The brightness region class change determining module 30211 may be configured to perform step 602, step 802, step 803, step 806, step 807, step 1003, step 1004, and step 6031 to step 6036.

The post-processing bloom effect module 2023 may be configured to perform step 604, step 810, and step 1007.

The rendering engine module 302 is further configured to present, on a display device of the terminal by invoking the OpenGL ES interface layer 3031 or invoking the Vulkan interface layer 3032, the bloom image of the first image generated by the high-dimensional high lightness region bloom algorithm optimization module 30231.

In conclusion, in the image bloom processing method provided in embodiments of this application, when determining that the first brightness region class in the first image is the same as the target brightness region class in the second image on which bloom processing is performed, the electronic device may directly obtain the intermediate image obtained after Gaussian blur processing is performed on the target brightness region class in the second image, and does not need to perform Gaussian blur processing on the first brightness region class in the first image. Therefore, in embodiments, while the bloom effect of the first image is ensured, the quantity of times Gaussian blur processing is performed on the first image may be reduced, and therefore the complexity of the image bloom processing process is reduced, thereby reducing the load of the electronic device in the running process after the bloom processing function is enabled, and reducing the power consumption of the electronic device.

In addition, when the first image includes a plurality of brightness region classes, when determining that the second image on which bloom processing is performed includes a brightness region class that is the same as the second brightness region class in the first image, the electronic device may further directly obtain the intermediate image obtained after Gaussian blur processing is performed on the brightness region class that is in the second image and that is the same as the second brightness region class, and does not need to perform Gaussian blur processing on the second brightness region class in the first image. Therefore, in embodiments of this application, while the bloom effect of the first image is ensured, the quantity of times Gaussian blur processing is performed on the first image may be further reduced, and therefore the complexity of the image bloom processing process is reduced, thereby reducing the load of the electronic device in the running process after the bloom processing function is enabled, and reducing the power consumption of the electronic device.

The following are apparatus embodiments of this application, and may be used to perform the method embodiments of this application. For details not disclosed in the apparatus embodiments of this application, refer to the method embodiments of this application.

Figure 12:
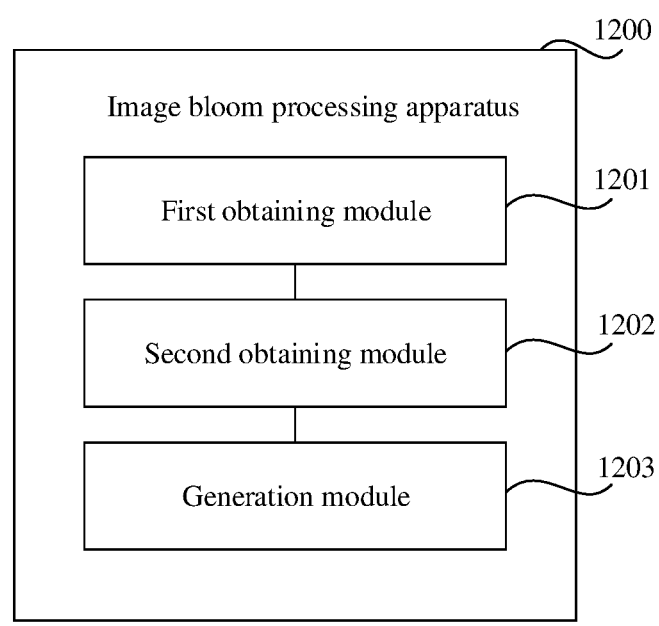
FIG. 12 is a block diagram of an image bloom processing apparatus according to an embodiment of this application.

FIG. 12 is a block diagram of an image bloom processing apparatus according to an embodiment of this application. The apparatus 1200 may include:

a first obtaining module 1201, configured to obtain a first brightness region class in a first image, where the first brightness region class includes one or more brightness regions in the first image;

a second obtaining module 1202, configured to: after it is determined that the first brightness region class in the first image is the same as a target brightness region class in a second image on which bloom processing is performed, obtain a first intermediate image obtained after Gaussian blur processing is performed on the target brightness region class in the second image; and a generation module 1203, configured to generate a bloom image of the first image based on the first image and the first intermediate image.

Optionally, the first image is obtained through rendering based on a first three-dimensional scene, the second image is obtained through rendering based on a second three-dimensional scene, and that the first brightness region class is the same as a target brightness region class includes:

Status information of an object model corresponding to the brightness region in the first brightness region class in the first three-dimensional scene is the same as status information of an object model corresponding to a brightness region in the target brightness region class in the second three-dimensional scene, and a camera parameter in the first three-dimensional scene is the same as a camera parameter in the second three-dimensional scene.

Figure 13:
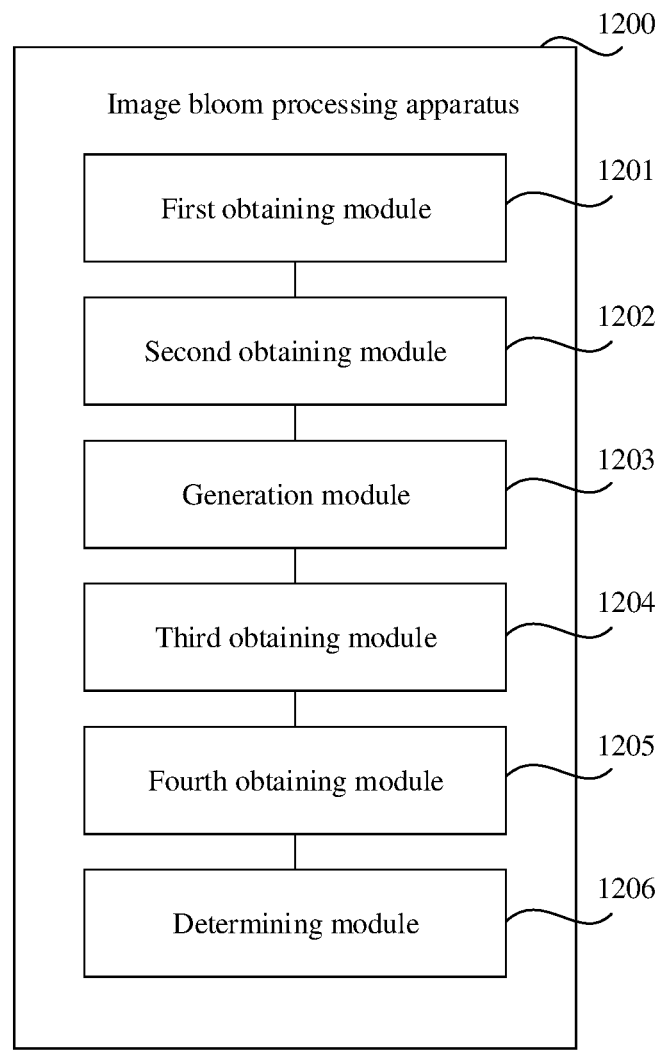
FIG. 13 is a block diagram of another image bloom processing apparatus according to an embodiment of this application.

Optionally, as shown in FIG. 13, the apparatus 1200 may further include:

a third obtaining module 1204, configured to obtain status information of all object models corresponding to the first brightness region class in the first three-dimensional scene and status information of all object models corresponding to the target brightness region class in the second three-dimensional scene;

a fourth obtaining module 1205, configured to: after it is determined that the status information of all the object models corresponding to the first brightness region class in the first three-dimensional scene is the same as the status information of all the object models corresponding to the target brightness region class in the second three-dimensional scene, obtain the camera parameter in the first three-dimensional scene and the camera parameter in the second three-dimensional scene; and a determining module 1206, configured to: after it is determined that the camera parameter in the first three-dimensional scene is the same as the camera parameter in the second three-dimensional scene, determine that the first brightness region class is the same as the target brightness region class.

Optionally, the status information of the object model includes position and posture information and surface material information of the object model, and the camera parameter includes a position and posture parameter, a view window parameter, and a field of view parameter of a camera.

Optionally, the first obtaining module 1201 is configured to: traverse labels of all object models in the first three-dimensional scene, where the label is used to indicate whether the object model is a background class object model; and obtain all background class object models in the first three-dimensional scene, where the first brightness region class includes background class brightness regions corresponding to all the background class object models in the first image.

Figure 14:
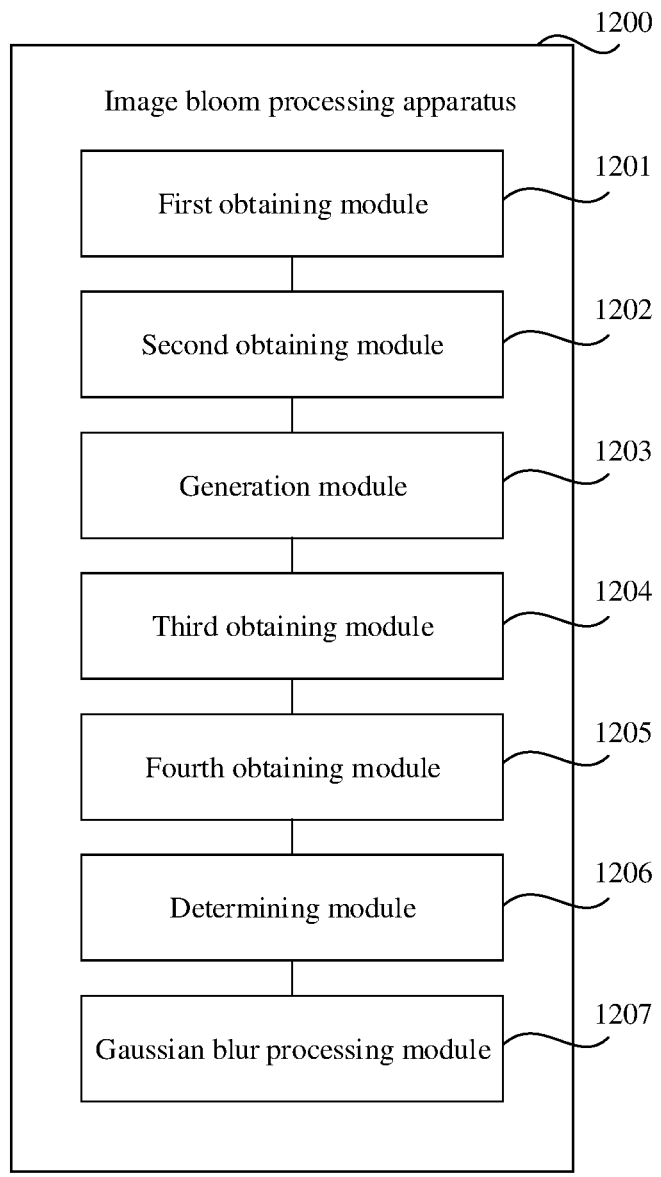
FIG. 14 is a block diagram of still another image bloom processing apparatus according to an embodiment of this application.

Optionally, the first image further includes a second brightness region, and a second brightness region class includes a brightness region other than the background class brightness region in the first image. As shown in FIG. 14, the apparatus 1200 may further include:

a Gaussian blur processing module 1207, configured to perform Gaussian blur processing on the second brightness region class, to obtain a second intermediate image. The generation module 1203 is configured to perform image fusion processing on the first image, the first intermediate image, and the second intermediate image, to obtain the bloom image of the first image.

Optionally, the first image further includes a second brightness region class, and the second brightness region class includes one or more brightness regions in the first image. Alternatively, the Gaussian blur processing module 1207 is configured to: after it is determined that the second brightness region class in the first image is different from any brightness region class in the second image, perform Gaussian blur processing on the second brightness region class, to obtain a second intermediate image. The generation module is configured to perform image fusion processing on the first image, the first intermediate image, and the second intermediate image, to obtain the bloom image of the first image.

Optionally, when a size of each brightness region in the first brightness region class is greater than a size of each brightness region in the second brightness region class, the Gaussian blur processing module 1207 is configured to: perform pixel reduction sampling processing on the first image by using a first reduction ratio, to obtain a first reduced image; and perform Gaussian blur processing on the first reduced image, to obtain the second intermediate image.

Alternatively, when a size of each brightness region in the first brightness region class is less than a size of each brightness region in the second brightness region class, the Gaussian blur processing module 1207 is configured to: perform pixel reduction sampling processing on the first image by using a second reduction ratio, to obtain a second reduced image; and perform Gaussian blur processing on the second reduced image, to obtain the second intermediate image. The first reduction ratio is greater than the second reduction ratio.

Optionally, the first reduction ratio k1 meets the following condition: $k1=2^n$, n is an integer, and $-3 \leq n \leq 0$, and the second reduction ratio k2 meets the following condition: $k2=2^m$, m is an integer, and $m \leftarrow -3$.

Figure 15:
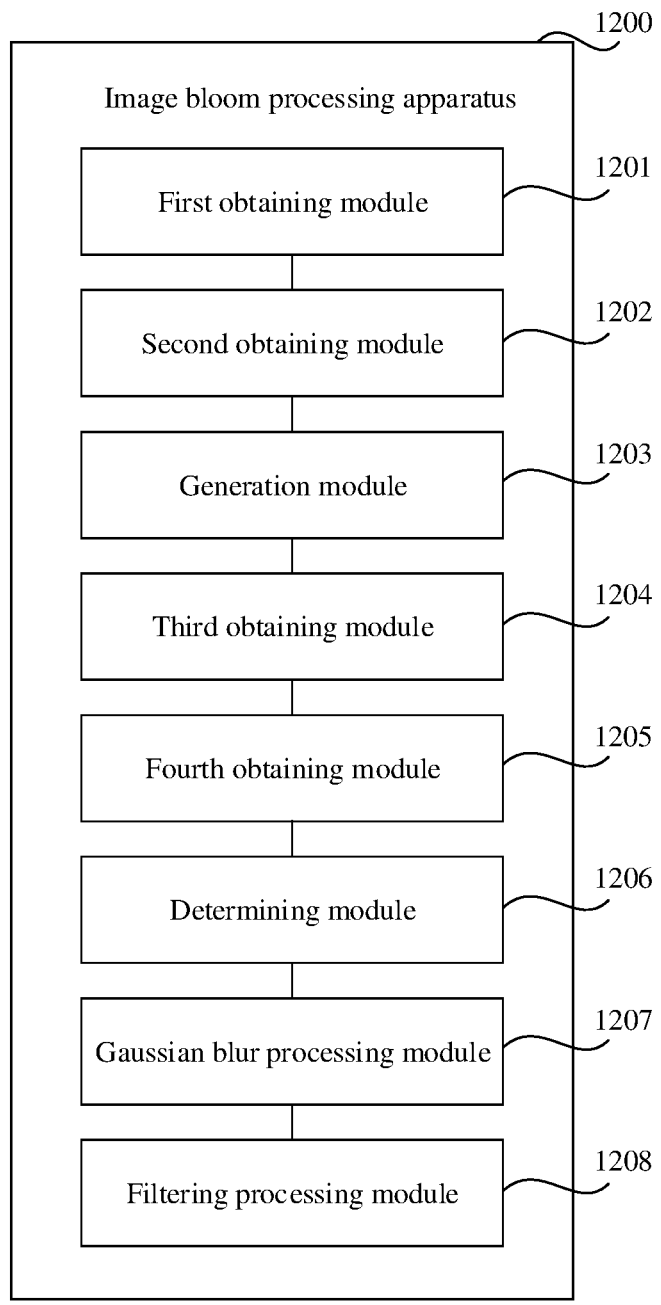
FIG. 15 is a block diagram of yet another image bloom processing apparatus according to an embodiment of this application.

Optionally, as shown in FIG. 15, the apparatus 1200 may further include:

a filtering processing module 1208, configured to perform brightness filtering processing on the first image before the bloom image of the first image is generated based on the first image and the first intermediate image.

Optionally, the first image and the second image are two consecutive frames of images, in other words, the second image is a previous frame of image of the first image.

In conclusion, when determining that the first brightness region class in the first image is the same as the target brightness region class in the second image on which bloom processing is performed, the image bloom processing apparatus provided in this embodiment of this application may directly obtain the intermediate image obtained after Gaussian blur processing is performed on the target brightness region class in the second image, and does not need to perform Gaussian blur processing on the first brightness region class in the first image. Therefore, in this embodiment, while a bloom effect of the first image is ensured, a quantity of times Gaussian blur processing is performed on the first image may be reduced, and therefore complexity of an image bloom processing process is reduced, thereby reducing load the image bloom processing apparatus in a running process after a bloom processing function is enabled, and reducing power consumption of the image bloom processing apparatus.

In addition, when the first image includes a plurality of brightness region classes, when determining that the second image on which bloom processing is performed includes a brightness region class that is the same as the second brightness region class in the first image, the image bloom processing apparatus may further directly obtain an intermediate image obtained after Gaussian blur processing is performed on the brightness region class that is in the second image and that is the same as the second brightness region class, and does not need to perform Gaussian blur processing on the second brightness region class in the first image. Therefore, in this embodiment, while the bloom effect of the first image is ensured, the quantity of times Gaussian blur processing is performed on the first image may be further reduced, and therefore the complexity of the image bloom processing process is reduced, thereby reducing the load of the image bloom processing apparatus in the running process after the bloom processing function is enabled, and reducing the power consumption of the image bloom processing apparatus.

It may be clearly understood by a person skilled in the art that, for the purpose of convenient and brief description, for a detailed working process of the foregoing apparatus and module, refer to a corresponding process in the foregoing method embodiments.

In addition, each module in the foregoing apparatus may be implemented by software, or a combination of software and hardware. When at least one module is hardware, the hardware may be a logic integrated circuit module, and may specifically include a transistor, a logic gate array, an algorithm logic circuit, or the like. When at least one module is software, the software exists in a form of a computer program product, and is stored in a computer-readable storage medium. The software may be executed by a processor. Therefore, alternatively, the image bloom processing apparatus may be implemented by a processor by executing a software program. This is not limited in this embodiment.

Figure 16:
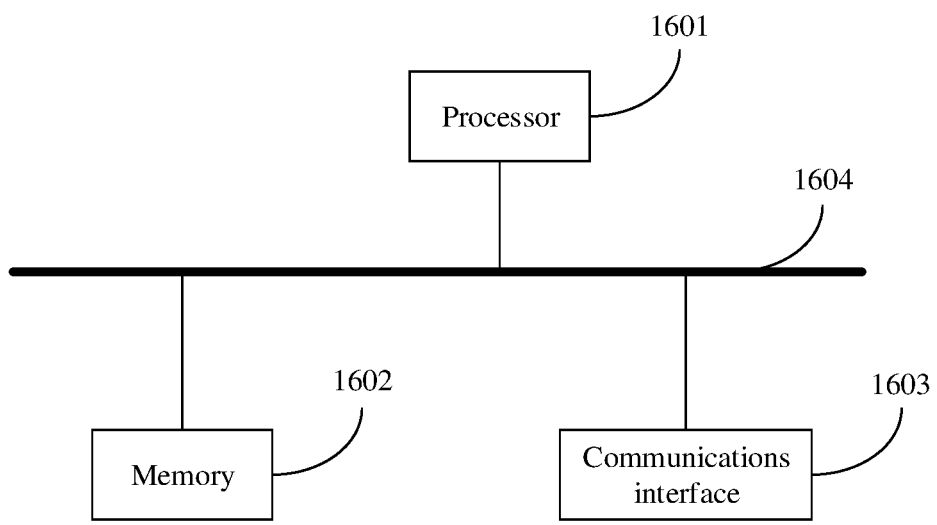
FIG. 16 is a schematic diagram of a structure of still another image bloom processing apparatus according to an embodiment of this application.

An embodiment of this application further provides an image bloom processing apparatus. As shown in FIG. 16, the apparatus includes a processor 1601 and a memory 1602. When the processor 1601 executes a computer program stored in the memory 1602, the image bloom processing apparatus performs the image bloom processing method provided in embodiments of this application. Optionally, the image bloom processing apparatus may be deployed in a terminal.

Optionally, the apparatus further includes a communications interface 1603 and a bus 1604. The processor 1601, the memory 1602, and the communications interface 1603 are communicatively connected by using the bus 1604. There are a plurality of communications interfaces 1603, configured to communicate with another device under control of the processor 1601. The processor 1601 can invoke, by using the bus 1604, the computer program stored in the memory 1602.

An embodiment of this application further provides a storage medium. The storage medium may be a non-volatile computer-readable storage medium. The storage medium stores a computer program, and the computer program indicates a processing component to perform any image bloom processing method provided in embodiments of this application. The storage medium may include any medium that can store program code, such as a read-only memory (ROM), a random access memory (RAM), a magnetic disk, or an optical disc.

An embodiment of this application further provides a computer program product including instructions. When the computer program product is run on a computer, the computer is enabled to perform the image bloom processing method provided in embodiments of this application. The computer program product may include one or more computer instructions. When the computer program instruction is loaded and executed on the computer, the procedures or functions according to embodiments of this application are all or partially generated. The computer may be a general-purpose computer, a dedicated computer, a computer network, or another programmable apparatus. The computer instruction may be stored in a computer-readable storage medium, or may be transmitted by using the computer-readable storage medium. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state disk (SSD)), or the like.

An embodiment of this application further provides a chip, for example, a CPU chip. The chip includes one or more physical cores and a storage medium. After reading computer instructions in the storage medium, the one or more physical cores implement the foregoing image bloom processing method. In some other embodiments, the chip may implement the image bloom processing method by using only hardware or a combination of software and hardware, in other words, the chip includes a logic circuit. When the chip runs, the logic circuit is configured to implement any image bloom processing method provided in embodiments of this application. The logic circuit may be a programmable logic circuit. Similarly, a GPU may also be implemented in a manner in which a CPU is implemented.

A person of ordinary skill in the art may understand that all or a part of the steps of the embodiments may be implemented by hardware or a program instructing related hardware. The program may be stored in a computer-readable storage medium. The storage medium may be a read-only memory, a magnetic disk, an optical disc, or the like.

In embodiments of this application, the terms "first", "second", and "third" are merely used for a purpose of description, and shall not be understood as an indication or implication of relative importance. Unless otherwise explicitly limited, the term "at least one" refers to one or more, and the term "a plurality of" refers to two or more.

The term "and/or" in this application describes only an association relationship for describing associated objects and indicates that three relationships may exist. For example, A and/or B may indicate the following three cases: Only A exists, both A and B exist, and only B exists. In addition, the character "/" in this specification generally indicates an "or" relationship between the associated objects.

The foregoing descriptions are merely optional embodiments of this application, but are not intended to limit this application. Any modification, equivalent replacement, or improvement made without departing from the concept and principle of this application should fall within the protection scope of this application.

What is claimed is:

1. An image bloom processing method, comprising:
   obtaining a first brightness region class in a first image, wherein the first brightness region class comprises one or more brightness regions in the first image;
   after determining that the first brightness region class in the first image is the same as a target brightness region class in a second image on which bloom processing is performed, obtaining a result of performing Gaussian blur processing on the target brightness region class in the second image as a first intermediate image; and
   generating a bloom image of the first image based on the first image and the first intermediate image.

2. The method according to claim 1, wherein the first image is obtained through rendering based on a first three-dimensional scene, the second image is obtained through rendering based on a second three-dimensional scene, and that the first brightness region class is the same as a target brightness region class comprises:
   status information of an object model corresponding to the one or more brightness regions in the first brightness region class in the first three-dimensional scene is the same as status information of an object model corresponding to one or more brightness regions in the target brightness region class in the second three-dimensional scene, and a camera parameter in the first three-dimensional scene is the same as a camera parameter in the second three-dimensional scene.

3. The method according to claim 2, further comprising:
   obtaining status information of all object models corresponding to the first brightness region class in the first three-dimensional scene and status information of all object models corresponding to the target brightness region class in the second three-dimensional scene;
   after determining that the status information of all the object models corresponding to the first brightness region class in the first three-dimensional scene is the same as the status information of all the object models corresponding to the target brightness region class in the second three-dimensional scene, obtaining the camera parameter in the first three-dimensional scene and the camera parameter in the second three-dimensional scene; and
   after determining that the camera parameter in the first three-dimensional scene is the same as the camera parameter in the second three-dimensional scene, determining that the first brightness region class is the same as the target brightness region class.

4. The method according to claim 2, wherein the status information of the object model comprises position and posture information and surface material information of the object model, and the camera parameter comprises a position and posture parameter, a view window parameter, and a field of view parameter of a camera.

5. The method according to claim 2, wherein the obtaining a first brightness region class in a first image comprises:
   traversing labels of all object models in the first three-dimensional scene, wherein the label indicates whether the object model is a background class object model; and
   obtaining all background class object models in the first three-dimensional scene, wherein the first brightness region class comprises background class brightness regions corresponding to all the background class object models in the first image.

6. The method according to claim 5, wherein the first image further comprises a second brightness region, a second brightness region class comprises a brightness region other than a background class brightness region in the first image, and the method further comprises:
   performing Gaussian blur processing on the second brightness region class, to obtain a second intermediate image; and
   the generating a bloom image of the first image based on the first image and the first intermediate image comprises:
   performing image fusion processing on the first image, the first intermediate image, and the second intermediate image, to obtain the bloom image of the first image.

7. The method according to claim 1, wherein the first image further comprises a second brightness region class, the second brightness region class comprises one or more brightness regions in the first image, and the method further comprises:
   after determining that the second brightness region class in the first image is different from any brightness region class in the second image, performing Gaussian blur processing on the second brightness region class, to obtain a second intermediate image; and
   the generating a bloom image of the first image based on the first image and the first intermediate image comprises:
   performing image fusion processing on the first image, the first intermediate image, and the second intermediate image, to obtain the bloom image of the first image.

8. The method according to claim 6, wherein when a size of each brightness region in the first brightness region class is greater than a size of each brightness region in the second brightness region class, the performing Gaussian blur processing on the second brightness region class in the first image comprises:
   performing pixel reduction sampling processing on the first image by using a first reduction ratio, to obtain a first reduced image; and
   performing Gaussian blur processing on the first reduced image, to obtain the second intermediate image, and
   when a size of each brightness region in the first brightness region class is less than a size of each brightness region in the second brightness region class, the performing Gaussian blur processing on the second brightness region class in the first image comprises:
   performing pixel reduction sampling processing on the first image by using a second reduction ratio, to obtain a second reduced image; and performing Gaussian blur processing on the second reduced image, to obtain the second intermediate image, wherein the first reduction ratio is greater than the second reduction ratio.

9. The method according to claim 8, wherein the first reduction ratio k1 meets a condition: $k1=2^n$, n is an integer, and $-3 \le n \le 0$, and the second reduction ratio k2 meets a condition: $k2=2^m$, m is an integer, and $m \leftarrow 3$.

10. The method according to claim 1, wherein before the generating a bloom image of the first image based on the first image and the first intermediate image, the method further comprises:

performing brightness filtering processing on the first image.

11. An image bloom processing apparatus, comprising a memory and at least one processor, wherein the memory is configured to store a computer program, and the at least one processor is configured to invoke the computer program from the memory and run the computer program to perform operations comprising:

obtaining a first brightness region class in a first image, wherein the first brightness region class comprises one or more brightness regions in the first image;

after determining that the first brightness region class in the first image is the same as a target brightness region class in a second image on which bloom processing is performed, obtaining a result of performing Gaussian blur processing on the target brightness region class in the second image as a first intermediate image; and generating a bloom image of the first image based on the first image and the first intermediate image.

12. The apparatus according to claim 11, wherein the first image is obtained through rendering based on a first three-dimensional scene, the second image is obtained through rendering based on a second three-dimensional scene, and that the first brightness region class is the same as a target brightness region class comprises:

status information of an object model corresponding to the one or more brightness regions in the first brightness region class in the first three-dimensional scene is the same as status information of an object model corresponding to one or more brightness regions in the target brightness region class in the second three-dimensional scene, and a camera parameter in the first three-dimensional scene is the same as a camera parameter in the second three-dimensional scene.

13. The apparatus according to claim 12, wherein the operations further comprise:

obtaining status information of all object models corresponding to the first brightness region class in the first three-dimensional scene and status information of all object models corresponding to the target brightness region class in the second three-dimensional scene;

after determining that the status information of all the object models corresponding to the first brightness region class in the first three-dimensional scene is the same as the status information of all the object models corresponding to the target brightness region class in the second three-dimensional scene, obtaining the camera parameter in the first three-dimensional scene and the camera parameter in the second three-dimensional scene; and after determining that the camera parameter in the first three-dimensional scene is the same as the camera parameter in the second three-dimensional scene, determining that the first brightness region class is the same as the target brightness region class.

14. The apparatus according to claim 13, wherein the status information of the object model comprises position and posture information and surface material information of the object model, and the camera parameter comprises a position and posture parameter, a view window parameter, and a field of view parameter of a camera.

15. The apparatus according to claim 13, wherein the obtaining a first brightness region class in a first image comprises:

traversing labels of all object models in the first three-dimensional scene, wherein the label indicates whether the object model is a background class object model; and obtaining all background class object models in the first three-dimensional scene, wherein the first brightness region class comprises background class brightness regions corresponding to all the background class object models in the first image.

16. The apparatus according to claim 15, wherein the first image further comprises a second brightness region, a second brightness region class comprises a brightness region other than a background class brightness region in the first image, and the operations further comprise:

performing Gaussian blur processing on the second brightness region class, to obtain a second intermediate image; and the generating a bloom image of the first image based on the first image and the first intermediate image comprises:

performing image fusion processing on the first image, the first intermediate image, and the second intermediate image, to obtain the bloom image of the first image.

17. The apparatus according to claim 11, wherein the first image further comprises a second brightness region class, the second brightness region class comprises one or more brightness regions in the first image, and the operations further comprise:

after determining that the second brightness region class in the first image is different from any brightness region class in the second image, performing Gaussian blur processing on the second brightness region class, to obtain a second intermediate image; and the generating a bloom image of the first image based on the first image and the first intermediate image comprises:

performing image fusion processing on the first image, the first intermediate image, and the second intermediate image, to obtain the bloom image of the first image.

18. The apparatus according to claim 16, wherein when a size of each brightness region in the first brightness region class is greater than a size of each brightness region in the second brightness region class, the performing Gaussian blur processing on the second brightness region class in the first image comprises:

performing pixel reduction sampling processing on the first image by using a first reduction ratio, to obtain a first reduced image; and performing Gaussian blur processing on the first reduced image, to obtain the second intermediate image, and when a size of each brightness region in the first brightness region class is less than a size of each brightness region in the second brightness region class, the performing Gaussian blur processing on the second brightness region class in the first image comprises:

performing pixel reduction sampling processing on the first image by using a second reduction ratio, to obtain a second reduced image; and performing Gaussian blur processing on the second reduced image, to obtain the second intermediate image, wherein the first reduction ratio is greater than the second reduction ratio.

19. The apparatus according to claim 18, wherein the first reduction ratio k1 meets a condition: $k1=2^n$, n is an integer, and $-3 \leq n \leq 0$, and the second reduction ratio k2 meets a condition: $k2=2^m$, m is an integer, and $m \leftarrow 3$.

20. The apparatus according to claim 11, wherein before the generating a bloom image of the first image based on the first image and the first intermediate image, the method further comprises:

performing brightness filtering processing on the first image.

\* \* \* \* \*

UNITED STATES PATENT AND TRADEMARK OFFICE
CERTIFICATE OF CORRECTION

| | | |
|---|---|---|
| PATENT NO. | : 12,086,957 B2 | Page 1 of 1 |
| APPLICATION NO. | : 17/726674 | |
| DATED | : September 10, 2024 | |
| INVENTOR(S) | : Yixin Deng et al. | |

It is certified that error appears in the above-identified patent and that said Letters Patent is hereby corrected as shown below:

In the Claims

Column 29, Line 5, change "Pin" to --P in--.

Signed and Sealed this
Eighth Day of October, 2024

Katherine Kelly Vidal
*Director of the United States Patent and Trademark Office*